(12) United States Patent
Zises

(10) Patent No.: US 11,527,268 B2
(45) Date of Patent: Dec. 13, 2022

(54) SYSTEMS AND METHODS FOR MARKING CONTENT

(71) Applicant: PayPal, Inc., San Jose, CA (US)

(72) Inventor: Matthew Scott Zises, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 423 days.

(21) Appl. No.: 15/423,576

(22) Filed: Feb. 2, 2017

(65) Prior Publication Data

US 2017/0236553 A1    Aug. 17, 2017

Related U.S. Application Data

(63) Continuation of application No. 15/092,821, filed on Apr. 7, 2016, now Pat. No. 9,576,611, which is a
(Continued)

(51) Int. Cl.
| | |
|---|---|
| G06F 3/048 | (2013.01) |
| G11B 27/34 | (2006.01) |
| G06F 3/01 | (2006.01) |
| H04N 21/414 | (2011.01) |
| H04N 21/44 | (2011.01) |
| H04N 21/45 | (2011.01) |
| H04N 21/472 | (2011.01) |
| H04N 21/658 | (2011.01) |

(Continued)

(52) U.S. Cl.
CPC ........... *G11B 27/34* (2013.01); *G06F 3/01* (2013.01); *G11B 27/00* (2013.01); *G11B 27/102* (2013.01); *G11B 27/105* (2013.01); *G11B 27/11* (2013.01); *H04N 21/00* (2013.01); *H04N 21/4147* (2013.01); *H04N 21/41407* (2013.01); *H04N 21/44008* (2013.01); *H04N 21/4524* (2013.01); *H04N 21/4532* (2013.01); *H04N 21/4756* (2013.01); *H04N 21/47217* (2013.01); *H04N 21/6581* (2013.01); *H04N 21/8455* (2013.01)

(58) Field of Classification Search
CPC ................................. G06F 3/01; G11B 27/34
See application file for complete search history.

(56) References Cited

U.S. PATENT DOCUMENTS

| | | | |
|---|---|---|---|
| 9,094,692 B2 | 7/2015 | Zises | |
| 2001/0051516 A1* | 12/2001 | Nakamura | H04N 7/163 455/45 |

(Continued)

OTHER PUBLICATIONS

U.S. Appl. No. 13/646,283, Examiner Interview Summary dated Dec. 23, 2014, 3 pages.

(Continued)

*Primary Examiner* — Hua Lu

(57) ABSTRACT

According to various embodiments, a content marking command is received from a mobile device at a particular time. For example, a user selection of the content marking command may be received via a user interface displayed on the mobile device. The content marking command may indicate a user interest in a particular moment of an event viewed by the user. Moreover, the event viewed by the user and video content data corresponding to the event may be identified. Further, content marking data may be generated, whether content marking data indicates a particular portion of the identified video content data corresponding to the particular moment of the event.

20 Claims, 24 Drawing Sheets

Related U.S. Application Data continuation of application No. 14/795,807, filed on Jul. 9, 2015, now Pat. No. 9,357,268, which is a continuation of application No. 13/646,283, filed on Oct. 5, 2012, now Pat. No. 9,094,692.

(51) Int. Cl.
| | |
|---|---|
| *H04N 21/845* | (2011.01) |
| *G11B 27/10* | (2006.01) |
| *G11B 27/11* | (2006.01) |
| *G11B 27/00* | (2006.01) |
| *H04N 21/00* | (2011.01) |
| *H04N 21/475* | (2011.01) |
| *H04N 21/4147* | (2011.01) |

(56) References Cited

U.S. PATENT DOCUMENTS

| | | | | |
|---|---|---|---|---|
| 2003/0177504 | A1* | 9/2003 | Paulo | H04N 21/4622 725/123 |
| 2004/0255336 | A1* | 12/2004 | Logan | H04N 21/4663 725/38 |
| 2005/0060350 | A1* | 3/2005 | Baum | G06F 16/4387 |
| 2006/0104600 | A1* | 5/2006 | Abrams | H04L 65/613 386/230 |
| 2006/0165283 | A1* | 7/2006 | DeWitt | G11B 27/28 382/173 |
| 2007/0018952 | A1* | 1/2007 | Arseneau | H04N 21/2747 345/156 |
| 2007/0043875 | A1* | 2/2007 | Brannon | H04N 21/23608 709/231 |
| 2007/0094307 | A1* | 4/2007 | Nam | G11B 27/031 386/E5.052 |
| 2008/0250023 | A1* | 10/2008 | Baker | G06Q 20/00 707/999.102 |
| 2009/0074235 | A1* | 3/2009 | Lahr | G06F 16/183 382/100 |
| 2009/0083631 | A1* | 3/2009 | Sidi | H04L 67/535 715/721 |
| 2010/0071013 | A1* | 3/2010 | Vandermolen | G06F 16/7867 725/109 |
| 2010/0287473 | A1* | 11/2010 | Recesso | G09B 5/00 715/716 |
| 2011/0075985 | A1* | 3/2011 | Potrebic | H04N 21/4147 386/235 |
| 2011/0173235 | A1* | 7/2011 | Aman | G06V 40/23 707/E17.055 |
| 2011/0225615 | A1* | 9/2011 | Stonedahl | G06Q 30/0601 725/86 |
| 2012/0011551 | A1* | 1/2012 | Levy | H04N 21/4532 725/97 |
| 2012/0219271 | A1* | 8/2012 | Vunic | G06V 20/40 704/235 |
| 2012/0269494 | A1* | 10/2012 | Satyanarayana | A63F 13/63 386/248 |
| 2012/0321277 | A1* | 12/2012 | Lee | H04N 21/8549 386/230 |
| 2013/0219278 | A1* | 8/2013 | Rosenberg | H04W 4/16 715/733 |
| 2014/0101550 | A1 | 4/2014 | Zises | |
| 2015/0297949 | A1* | 10/2015 | Aman | G06T 7/246 348/157 |
| 2016/0050460 | A1 | 2/2016 | Zises | |
| 2016/0253342 | A1* | 9/2016 | Ramer | H04L 67/52 707/727 |

OTHER PUBLICATIONS

U.S. Appl. No. 13/646,283, Non-Final Office Action dated Sep. 29, 2014, 16 pages.
U.S. Appl. No. 13/646,283, Notice of Allowance dated Mar. 19, 2015, 5 pages.
U.S. Appl. No. 13/646,283, Response filed Jan. 29, 2015 to Non-Final Office Action dated Sep. 29, 2014, 11 pages.
U.S. Appl. No. 14/795,807, Notice of Allowance dated Feb. 5, 2016, 8 pages.
U.S. Appl. No. 14/795,807, Preliminary Amendment filed Aug. 7, 2015, 7 pages.

* cited by examiner

CONTENT MARKING DATA 500

| Content Marking Command ID | Time | User Location | Event/Program | Video Recording | Marker |
|---|---|---|---|---|---|
| 1 | Jan 1, 2012 8:38pm | [x3,y3] | - | - | - |
| 2 | Jan 1, 2012 9:19pm | [x3,y3] | - | - | - |
| ... | ... | ... | ... | ... | ... |

*Fig. 5*

EVENT INFORMATION

| Live Event/Program | Location | Time | Video Recording |
|---|---|---|---|
| Redsox vs. Yankees | Fenway Park ([x3,y3]) | Jan 1, 2012, 8pm-10:00pm | link-RedSoxYank1112<br>link-RScompressed |
| Concert<br>Stand-Up Comedy Show<br>Opera<br>Play<br>Circus | Boston Concert Hall<br>Boston Comedy Club<br>Boston Opera House<br>Boston Dramatic Theater<br>Boston Exhibition Center | Jan 3, 2012, 9pm-11:00pm<br>Jan 4, 2012, 9pm-11:59pm<br>Jan 5, 2012, 7pm-9:00pm<br>Jan 6, 2012, 7pm-10:00pm<br>Jan 7, 2012, 3pm-8:00pm | link-Concert<br>link-StandUp<br>link-Opera<br>link-Play<br>link-Circus |
| ... | ... | ... | ... |

CONTENT MARKING DATA

| Content Marking Command ID | Time | User Location | Event/Program | Video Recording | Marker |
|---|---|---|---|---|---|
| 1 | Jan 1, 2012 8:38pm | [x3,y3] | Red Sox vs. Yankees (Baseball) | link-RedSoxYank1112 link-RScompressed | +0:38:00 +0:23:00 |
| 2 | Jan 1, 2012 9:19pm | [x3,y3] | Red Sox vs. Yankees (Baseball) | link-RedSoxYank1112 link-RScompressed | +1:19:00 +0:49:00 |
| ... | ... | ... | ... | ... | ... |

You marked a moment just 12 seconds ago (at 1:08pm)

Please select one:

● I am now marking the end of the moment that started 12 seconds ago (at 1:08pm)

○ I am now marking a new moment

Submit   Cancel

*Fig. 11a*

| CONTENT MARKING DATA | | | | 1110 |
|---|---|---|---|
| Event/Program | Video Recording | Beginning Content Marker | Ending Content Marker |
| Celtics vs. Lakers (Basketball) | link-CelticsLakers | +0:20:00 | +0:20:12 |

Please select the event you would like to view:

Red Sox vs. Yankees (Baseball) ✓
Bruins vs. Canadiens (Hockey)
Celtics vs. Lakers (Basketball)
...
...
...

Submit    Cancel

Please select the video recording of the event you would like to view:

Full Video Recording    ✓
Highlights / Compressed
...
...
...

Submit    Cancel

*Fig. 12b*

○ Mark for future reference/viewing (Like)
● Mark for ommission (Dislike)

[Submit] [Cancel]

*Fig. 16a*

○ Display warning before content
● Display blank screen
○ Display alternate channel
○ Display background picture
○ Display alternate video

[Submit] [Cancel]

*Fig. 16b*

DEVICE HISTORY INFORMATION — 1700

| Broadcast Event/Program | Channel | Time | Video Recording |
|---|---|---|---|
| Movie 1 | 67 | Jan 2, 2012, 3:55pm-4pm | link-Movie1 |
| Movie 2 | 5 | Jan 2, 2012, 4pm-5pm | link-Movie2 |
| TV Show | 99 | Jan 2, 2012, 5pm-5:30pm | link-TVShow |
| Sports News TV Program | 145 | Jan 2, 2012, 7pm-8pm | link-SportsNews1-2-12 |
| Bruins v. Canadiens (Hockey) | 31 | Jan 2, 2012, 8pm-10:00pm | link-Bruins1212 |
| ... | ... | ... | ... |

*Fig. 17*

CONTENT MARKING DATA 1800

| Content Marking Command ID | Time | User Location | Event/Program | Video Recording | Marker |
|---|---|---|---|---|---|
| 3 | Jan 2, 2012 7:05pm | [x5,y5] | Sports News TV Program | link-SportsNews1-2-12 | +0:05:00 |
| ... | ... | ... | ... | ... | ... |

This video recording is available for purchase in the following formats:

○ DVD      ○ Digital Download
● Blu Ray  ○ Digital Streaming

[ Purchase ]  [ Cancel ]

This video recording is not yet available for purchase.

It is available for pre-order and will be released Feb 1 in the following formats:

○ DVD      ○ Digital Download
● Blu Ray  ○ Digital Streaming

[ Pre-order ]  [ Remind me after release ]  [ Cancel ]

*Fig. 20b*

SYSTEMS AND METHODS FOR MARKING CONTENT

CROSS-REFERENCE TO RELATED APPLICATIONS

This application is a continuation of U.S. patent application Ser. No. 15/092,821, filed on Apr. 7, 2016; which is a continuation of U.S. patent application Ser. No. 14/795,807, filed on Jul. 9, 2015, now U.S. Pat. No. 9,357,268, issued May 31, 2016; which is continuation of U.S. patent application Ser. No. 13/646,283, filed on Oct. 5, 2012, now U.S. Pat. No. 9,094,692, issued Jul. 28, 2015; the disclosures of all of these applications and patents are incorporated by reference herein.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the field of electronic data and, in one specific example, to systems and methods for marking electronic content.

BACKGROUND OF THE INVENTION

Various recording systems permit a user to record content such as television shows or movies displayed on a television device. Such systems typically record a television show or movie by receiving video content data corresponding to the television show or movie, and storing this video content data on a hard drive connected to the television device. The television device may later access the video content data stored on the hard drive, to thereby playback the recorded television show or movie.

BRIEF DESCRIPTION OF THE DRAWINGS

Some embodiments are illustrated by way of example and not limitation in the figures of the accompanying drawings in which:

FIG. 5 illustrates an exemplary data table, according to various embodiments.

FIG. 6 illustrates an example of event information, according to various embodiments.

FIG. 9 illustrates an example of content marking data, according to various embodiments.

FIG. 11a illustrates an exemplary portion of a user interface, according to various embodiments.

FIG. 11b illustrates an example of content marking data, according to various embodiments.

FIGS. 12a and 12b illustrate exemplary portions of user interfaces, according to various embodiments.

FIGS. 16a and 16b illustrate exemplary portions of user interfaces, according to various embodiments.

FIG. 17 illustrates an example of device history information, according to various embodiments.

FIG. 18 illustrates an example of content marking data, according to various embodiments.

FIGS. 20a and 20b illustrate exemplary portions of user interfaces, according to various embodiments.

DETAILED DESCRIPTION OF THE PREFERRED EMBODIMENTS

Example methods and systems for marking content are described. In the following description, for purposes of explanation, numerous specific details are set forth in order to provide a thorough understanding of example embodiments. It will be evident, however, to one skilled in the art that the present invention may be practiced without these specific details.

Figure 1:
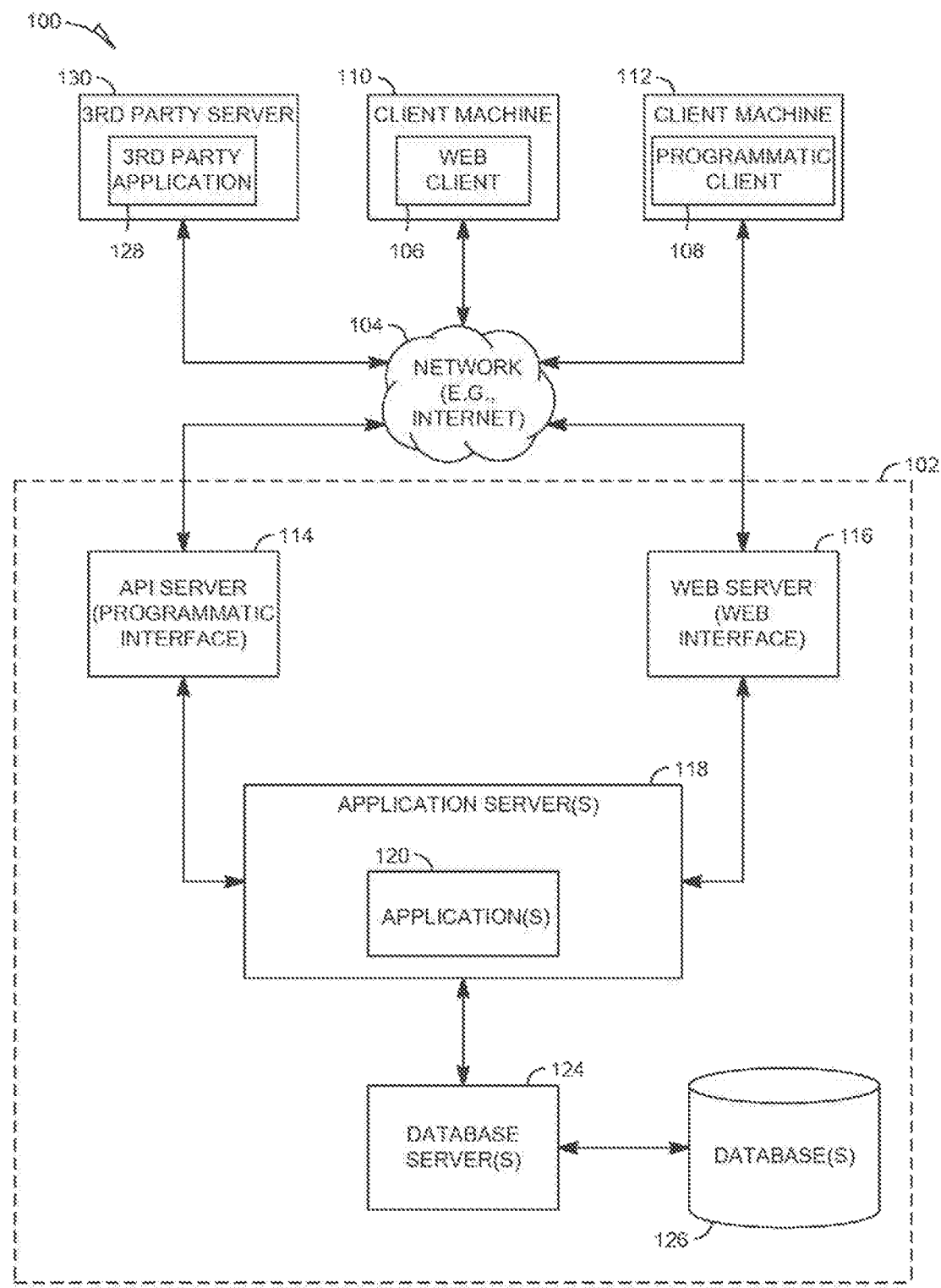
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
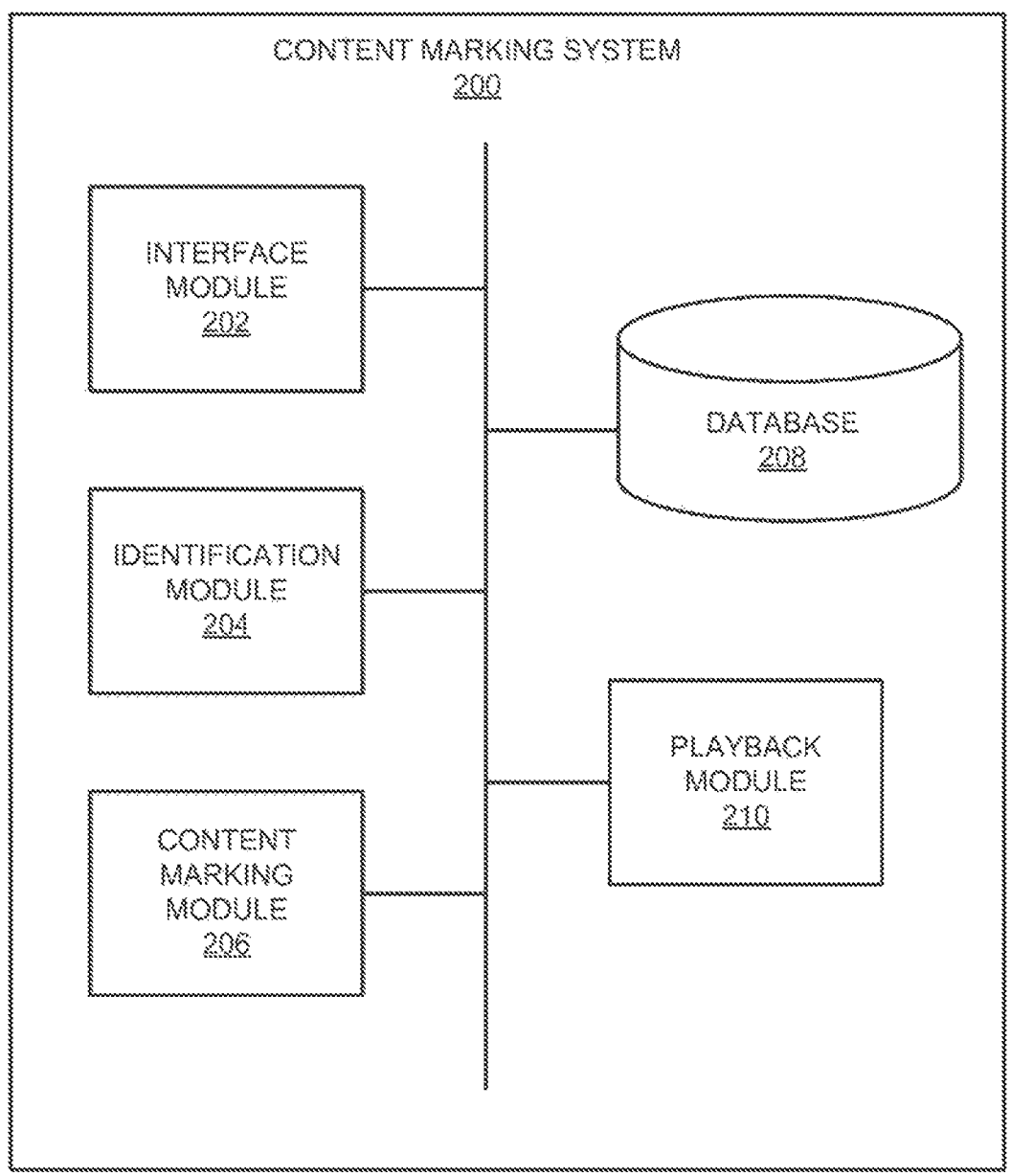
FIG. 2 is a block diagram of an example system, according to various embodiments.

Turning now to FIG. 2, a content marking system 200 includes an interface module 202, an identification module 204, a content marking module 206, a database 208, and a playback module 210. The modules of the content marking system 200 may be implemented on a single device such as a content marking device, or on separate devices interconnected via a network. The aforementioned content marking device may correspond to, for example, one of the client machines (e.g. 110, 112) or application server(s) 118 illustrated in FIG. 1.

According to various embodiments, the content marking system 200 allows a user viewing an event (such as, for example, a live sporting event or a live concert) to "mark" a particular moment during the event. Such a "mark" indicates that the user is interested in that particular moment of the event, and further indicates that the user may wish to access a video recording of the marked moment of the event at a later time. For example, a user attending a baseball game may realize that they were "just on TV" at a particular moment when a TV broadcast camera at the game was pointed in their direction. As another example, perhaps an especially memorable play occurred during a particular moment in the game. The content marking system 200 permits the user to easily "mark" these particular moments, so that when the user later views the video recording or broadcast footage of the game, they can directly and easily view the "marked" moments, without having to parse through the entire video recording of the whole game to search for these moments of interest.

Accordingly, in various exemplary embodiments, when a user viewing an event wishes to mark a particular moment of interest in the event, the user may select a content marking command displayed on a user interface of the user's mobile device (such as the user's smart phone, tablet, etc.). The content marking command thus indicates the user's interest in a particular moment of the event being viewed by the user. After receiving the content marking command from the user's mobile device, the content marking system 200 automatically identifies the event viewed by the user (e.g., the game or concert being viewed by the user). Further, the content marking system 200 also identifies video content data corresponding to the event, such as a video recording of the game or concert. The content marking system 200 then generates content marking data that may be associated with the appropriate video recording, where the content marking data indicates the particular portion of the identified video recording that corresponds to the particular moment that was marked by the user.

Figure 3:
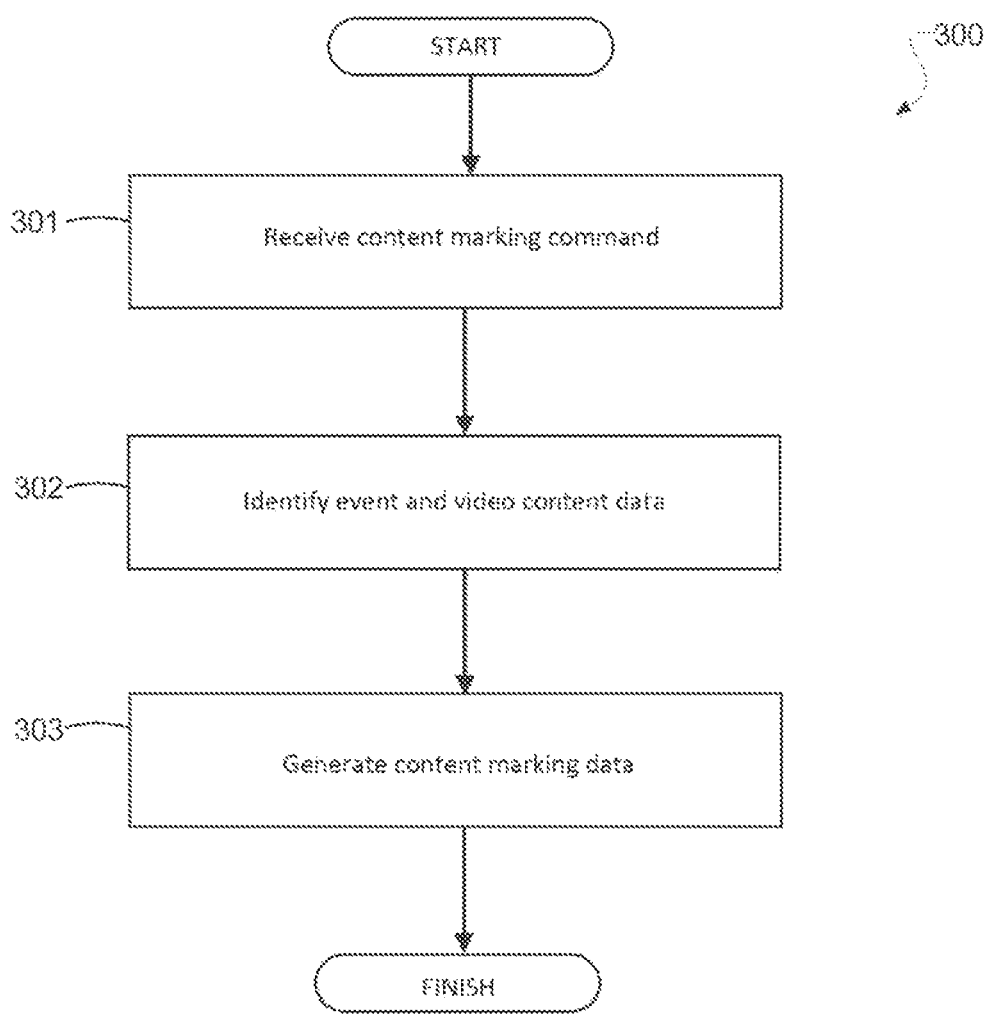
FIG. 3 is a flowchart illustrating an example method, according to various embodiments.

For example, FIG. 3 is a flowchart illustrating an example method 300, according to various embodiments. The method 300 may be performed at least in part by, for example, the content marking system 200 illustrated in FIG. 2 (or an apparatus having similar modules, such as client machines 110 and 112 or application server 112 illustrated in FIG. 1). In 301, the interface module 202 receives, via a user interface displayed on a mobile device, a user selection of a content marking command at a particular time, the content marking command indicating a user interest in a particular moment of an event viewed by a user. In 302, the identification module 204 identifies the event viewed by the user, as well as video content data corresponding to the event. In 303, the content marking module 206 generates content marking data indicating a particular portion of the video content data (identified in 302) that corresponds to the particular moment of the event viewed by the user. Each of the aforementioned modules of the content marking system 200 illustrated in FIG. 2 will now be described in further detail.

Figure 4A:
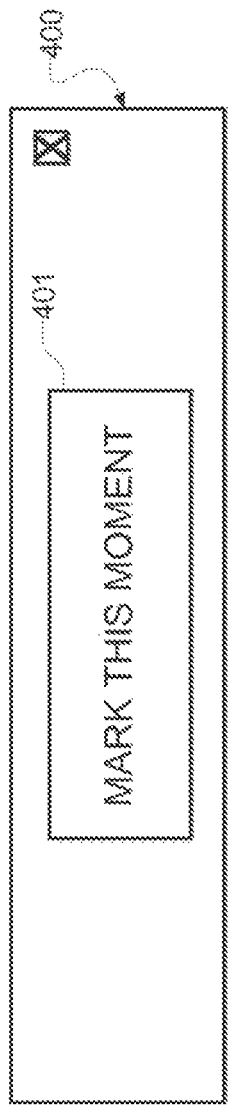
FIGS. 4a and 4b illustrate exemplary portions of user interfaces, according to various embodiments.

The interface module 202 is configured to receive a user selection of a content marking command at a particular time. For example, FIG. 4a illustrates an exemplary portion of a user interface 400 that may be displayed on a user's mobile device (e.g., client machines 110 and 112 illustrated in FIG. 1). An application installed on the user's mobile device may display the user interface 400, and/or a server (e.g., Web server 116 or application server 118 illustrated in FIG. 1) may transmit information to the user's mobile device causing the mobile device to display the user interface 400. The user interface 400 includes a user interface element such as a selection button 401 entitled "Mark This Moment" that, when actuated, represents a content marking command.

According to various exemplary embodiments, the content marking command indicates a user interest in a particular moment of an event viewed by a user, and further indicates that, at a later time, the user may wish to access a video recording of that moment in the event. As described throughout this disclosure, the term "event" refers broadly to anything being viewed by the user. Thus, an event may correspond to a live event at which the user is physically present. Non-limiting examples of live events include sporting events, concerts, comedy shows, opera performances, dramatic performances, plays, circus performances, speeches, and so on. An event may also be anything displayed on a display screen (e.g., a television screen, a computer monitor, smartphone screen, a tablet screen, a screen in a movie theater, etc.) that is being viewed by a user, such as a television show, a movie, a sporting event, and so on. Other examples of events are apparent to those skilled in the art.

Accordingly, when the user selects the selection button 401 illustrated in FIG. 4a at a particular time, the interface module 202 detects the selection or is notified of the selection of the content marking command. The interface module 202 obtains various information from the user's mobile device, such as the particular time when the selection button 401 was selected, and the location of the device/user at the particular time when the selection button 401 was selected. The location of the mobile device may be determined based on geo-location using a global positioning system (GPS) system of the mobile device, or based on triangulating device position using the signal strength of nearby known telecommunications towers, or based on other methods, as understood by those skilled in the art. The interface module 202 may record the user selection of the content marking command in a database table or similar data structure. For example, FIG. 5 illustrates an example of a data table 500 generated by the interface module 202 that includes content marking data that identifies various content marking commands associated with a particular user. Each entry in the data table 500 identifies a particular content marking command (e.g., by ID number), a particular time when the content marking command was received, and the location of the device/user from which the content marking command was received. For example, it can be seen in FIG. 5 that content marking command 1 was received on Jan. 1, 2012 at 8:38 pm, while the user was at location coordinates [x3, y3], while content marking command 2 was received on Jan. 1, 2012 at 9:19 pm, while the user was still at location coordinates [x3, y3]. Data table 500 may be stored or located at, for example, the database 208 illustrated in FIG. 2.

Figure 4B:
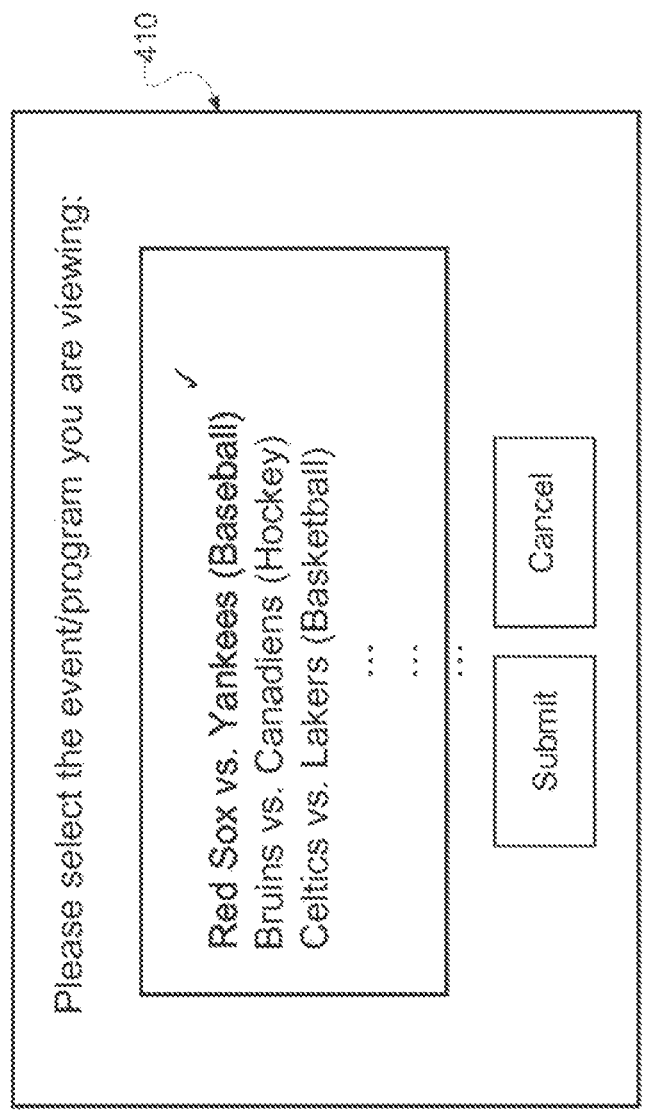

After the interface module 202 receives the user selection of the content marking command, the identification module 204 is configured to identify the event viewed by the user (e.g., a particular sporting event or concert) when the content marking command was received. The identification module 204 may identify the event in multiple ways. According to an exemplary embodiment, the user may simply specify the event directly. For example FIG. 4b illustrates a user interface screen 410 displayed on the mobile device of the user, where the user interface 410 allows the user to specify the event that the user is viewing (e.g., "Red Sox vs. Yankees (Baseball)"). The identification module 204 may cause the user interface 410 to be displayed on the mobile device of the user, after the user selects the selection button 401 in the user interface 400 of FIG. 4a.

According to another exemplary embodiment, it is not necessary for the user to specify the event that the user is viewing when they submit the content marking command. Indeed, requiring the user to manually specify the event may prove cumbersome and time-consuming for the user, especially if the user is utilizing a mobile device. Thus, according to various exemplary embodiments, the identification module 204 automatically determines the event that the user is viewing, by accessing event information that lists multiple events, as well as times and locations associated with each of those events. For example, FIG. 6 illustrates an exemplary data table or similar data structure that includes event information 600. Each entry in the event information illustrated in FIG. 6 lists a live event/program (e.g., "Red Sox vs. Yankees" baseball game), a location associated with that event (e.g., "Fenway Park" and/or a street address or geographical co-ordinates [x3,y3]), as well as a time associated with that event (e.g., "Jan. 1, 2012, 8 pm to 10 pm"). Data table 600 may be stored or located at, for example, the database 208 illustrated in FIG. 2. The identification module 204 may generate the event information 600 by collecting information describing various events from one or more disparate sources, such as event websites that describe events.

Figure 7:
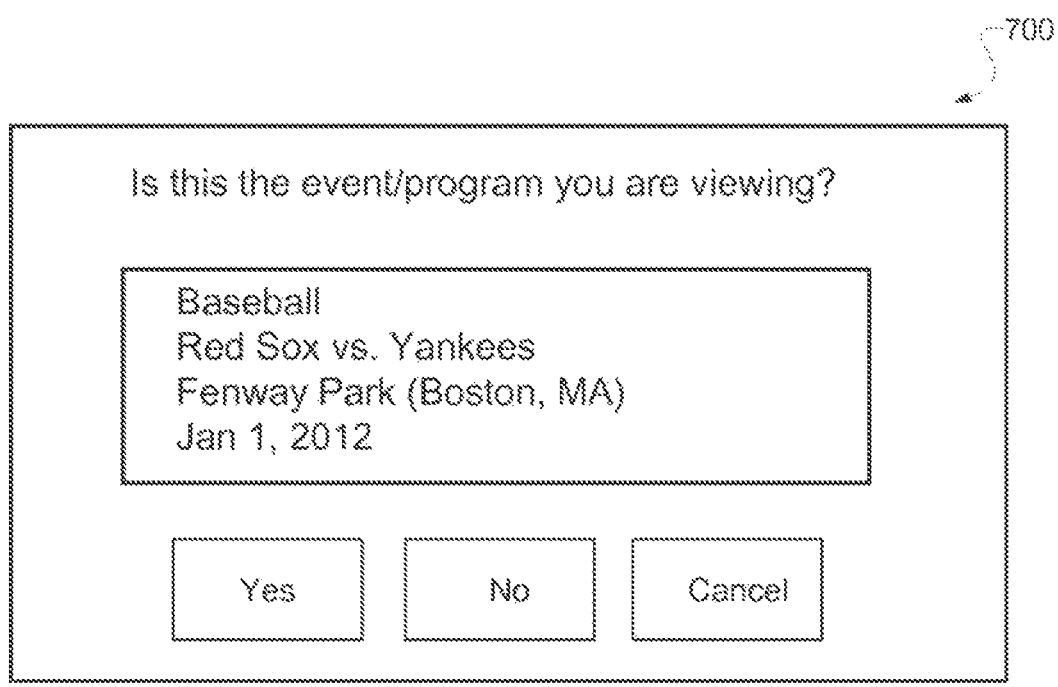
FIG. 7 illustrates an exemplary portion of a user interface, according to various embodiments.

The identification module 204 may compare the information associated with a received content marking command (e.g., the time at which the content marking command was received, and the location of the user when the content marking command was received) with the event information, to identify a match with an event in the event information and to thereby determine the event that the user was viewing when he/she submitted the content marking command. For example, comparing the content marking data illustrated in FIG. 5 and the event information illustrated in FIG. 6, the identification module 204 may determine that, since the user was at location [x3, y3] when they submitted content marking commands 1 and 2 (where coordinates [x3, y3] may correspond to the location of "Fenway Park" where the Red Sox vs. Yankees baseball game occurred, see FIG. 6), and since the user submitted content marking commands 1 and 2 at times 8:38 pm and 9:19 pm, respectively, on Jan. 1, 2012 (which matches the time when the Red Sox vs. Yankees baseball game was occurring—i.e., Jan. 1, 2012, 8 pm to 10 pm, see FIG. 6), the identification module 204 may determine that the event that the user was viewing when they submitted the content marking commands 1 and 2 was, in fact, the Red Sox vs. Yankees baseball game. The identification module 204 may optionally display a user interface on the user's mobile device that requests the user to confirm the determination of the event (e.g., see exemplary user interface 700 in FIG. 7).

After the identification module 204 identifies the event that the user was viewing when they submitted a content marking command, the identification module 204 is also configured to identify video content data corresponding to the event. The video content data may be any video recording of the event, such as a stored television broadcast of the event, a streaming video of the event, and so on, as understood by those skilled in the art. As described in more detail below, it is possible that multiple video recordings of the event may exist, such as a full video recording of the entire event, or a compressed video recording including highlights of the event. The event information illustrated in FIG. 6 may indicate, for each event, a location where video content data (e.g., one or more video recordings) corresponding to that event may be obtained. For example, the event information may include one or more reference links (e.g., a uniform resource locator or URL) for accessing one or more video recordings of the event, where each reference link identifies a location (e.g., storage location associated with a database) where that video recording may be accessed. For example, as illustrated in FIG. 6, the event information 600 for the event "Red Sox vs. Yankees" includes a reference link "link-RedSoxYank1112" that can be used to access a full video recording of the event, and a reference link "link-RScompressed" that can be used to access a compressed video recording of the event, as described in further detail below.

The aforementioned reference links may be links to online storage repositories of official distributors of content related to each event, such as, for example, a sporting league or a particular television broadcast network associated with the event. For example, when generating the event information 600, the identification module 204 may communicate with such official distributors, in order to obtain the reference links to the events for inclusion in the event information 600. The aforementioned reference links may instead be links to storage locations in a hard drive connected to a digital video recorder (DVR) device connected to the system 200 that has recorded various video recordings. For example, when generating the event information 600, the identification module 204 may scan the hard drive or recording log of the DVR device to determine what events have been recorded by the DVR device for inclusion in the event information 600.

After the identification module 204 identifies video content data corresponding to an event that the user was viewing, the content marking module 206 is configured to generate content marking data indicating a particular portion of the identified video content data that corresponds to the particular moment of the event that was marked by the user. Referring back to FIG. 5, suppose the user attending the Red Sox vs. Yankees baseball game submitted content marking command 1 at 8:38 pm because the user believe that they were captured by TV cameras at the game, while the user submitted content marking command 2 at 9:19 pm when a memorable play happened during the game. An example of how content marking data is generated in this situation will be described in conjunction with FIGS. 8 and 9.

Figure 8:
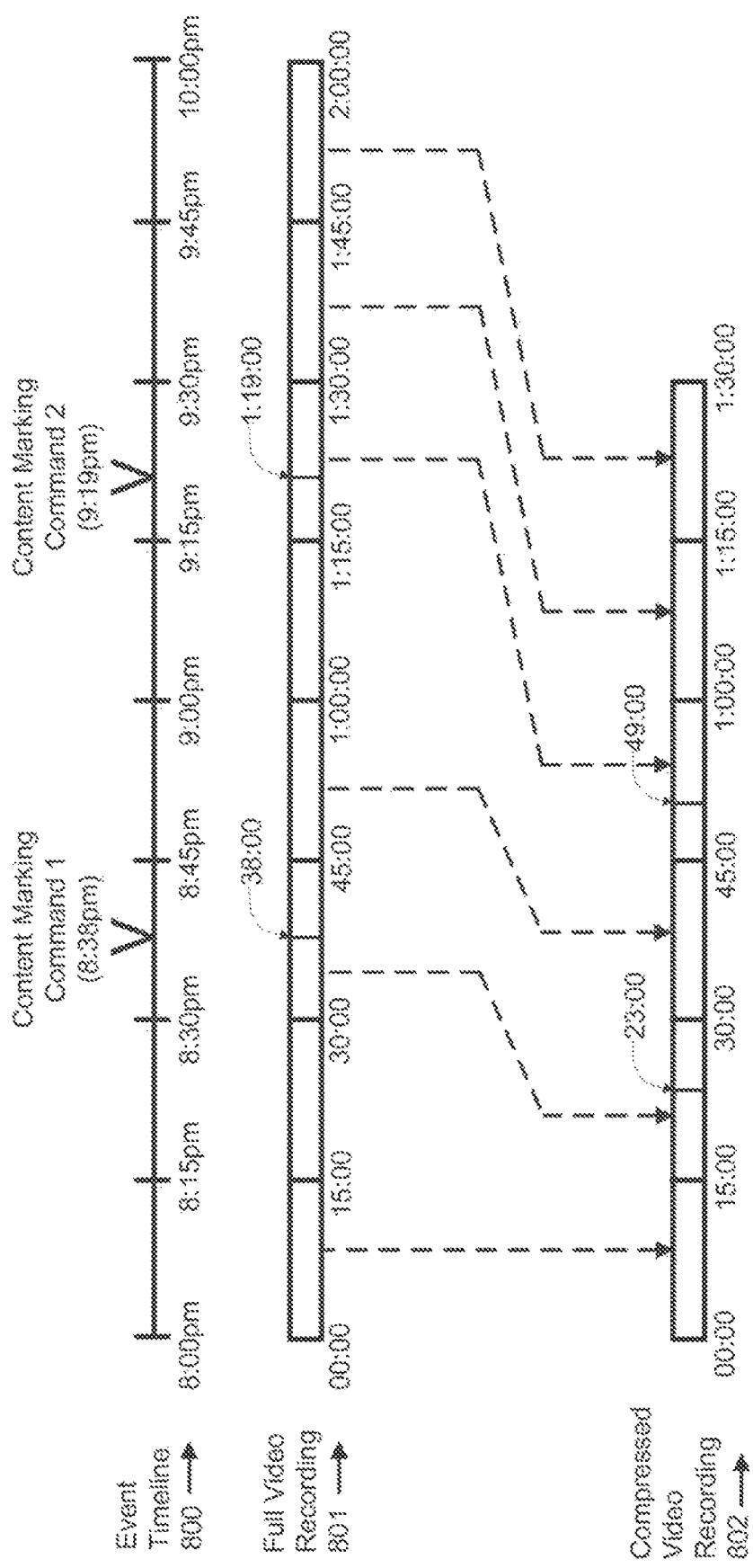
FIG. 8 depicts an example of an event timeline, a full video recording and a compressed video recording, according to various embodiments.

FIG. 8 depicts an event timeline 800 corresponding to the Red Sox vs. Yankees baseball game. As depicted by the event timeline 800, the Red Sox vs. Yankees baseball game started at 8 pm and finished at 10 pm, having a duration of 2 hours. As described above and as illustrated in FIG. 8, content marking command 1 was received at 8:38 pm, while content marking command 2 was received at 9:19 pm. FIG. 8 also depicts a full video recording 801 of the Red Sox vs. Yankees baseball game (corresponding to the video recording "link-RedSoxYank1112" illustrated in FIG. 6). The full video recording 801 is a live, real-time, uninterrupted recording of the Red Sox vs. Yankees baseball game, and tracks the baseball game exactly. Put another way, the full video recording 801, like the baseball game, is 2 hours in duration, so that the events that occurred at approximately 8 pm (i.e., around the beginning of the baseball game) will be recorded around the 0:00:00 mark of the full video recording 801, while the events that occurred at approximately 10 pm (i.e., around the end of the baseball game) will be recorded around the 2:00:00 mark of the full video recording 801.

The content marking module 206 may compare the times at which the particular content marking commands were received (8:38 pm and 9:19 pm) with the start and end times of the game in the event information in FIG. 6 (i.e., 8 pm and 10 pm). The identification module 204 may thus determine that, since the game started at 8 pm and content marking command 1 was received at 8:38 pm, the content marking data will include a marker indicating the 0:38:00 mark of the full video recording 801. Similarly, the identification module 204 may determine that, since the game started at 8 pm and content marking command 2 was received at 9:19 pm, the content marking data will include a marker indicating the 1:19:00 mark of the full video recording 801.

FIG. 9 illustrates exemplary content marking data 900 generated by the content marking module 206. The content marking data 900 identifies, for each received content marking command, the event that the user attended, reference links to one or more video recordings of the event, and markers that signify the portions of the aforementioned video recordings that correspond to the moments that were marked by the user. For example, for the video recording "link-RedSoxYank1112" (corresponding to the full video recording 801 illustrated in FIG. 8), one marker indicates the 0:38:00 mark of the video recording (for the moment marked by content marking command 1), and another marker indicates the 1:19:00 mark of the video recording (for the moment marked by content marking command 2). The content marking data 900 may be stored or located at, for example, the database 208 illustrated in FIG. 2.

Turning back to FIG. 8, the content marking module 206 is also configured to generate the content markers for video recordings of the event that may not exactly track the event. For example, it is possible that a video recording may be shorter in duration than an actual event, perhaps because the video recording represents a compressed broadcast and/or a broadcast focused on highlights of the event. For example, FIG. 8 illustrates compressed video recording 802 that is a shortened version of full video recording 801. In particular, portions of full video recording 801 extending from 0:15:00 to 0:30:00 and 1:00:00 to 1:15:00 (corresponding to events in the baseball game that occurred between 8:15 pm and 8:30 pm, and between 9:00 pm and 9:15 pm) have been removed, in order to generate compressed video recording 802 having a duration of only 1:30:00.

If the content marking module 206 accesses information indicating which portions of the event or full video recording 801 have been removed during the generation of the compressed video recording 802, the content marking module 206 may generate adjusted content markers for the compressed video recording 802 accordingly. For example, the content marking module 206 may access information indicating that, while the Red Sox vs. Yankees baseball game ran from 8-10 pm, the compressed video recording 802 does not include coverage of the event from 8:15 to 8:30 pm or from 9 pm to 9:15 pm. The content marking module 206 may therefore determine that 15 minutes of coverage of the event between the beginning of the event (at 8 pm) and the moment when the content marking command 1 is received (at 8.38 pm) is missing from the compressed video recording 802. Thus, although content marking command 1 was received 38 minutes after the start of the event, the moment marked by content marking command 1 is recorded at the 23 minute mark of the compressed video recording 802. Thus, the content marking module 206 may determine that the events that occurred at 8:38 pm when content marking command 1 was submitted are recorded at the 0:23:00 mark of the compressed video recording 802, and the content marking module 206 will generate a marker indicating the 0:23:00 mark of the compressed video recording 802.

Further, the content marking module 206 may determine that 30 minutes of coverage of the event between the beginning of the event (at 8 pm) and the moment when the content marking command 2 is received (at 9.19 pm) is missing from the compressed video recording 802. Thus, although content marking command 2 was received 1 hour and 19 minutes after the start of the event, the moments marked by content marking command 2 are recorded at the 49 minute mark of the compressed video recording 802. Thus, the content marking module 206 may determine that the events that occurred at 9:19 pm when content marking command 2 was submitted are recorded at the 0:49:00 mark of the compressed video recording 802, and the content marking module 206 will generate a marker indicating the 0:49:00 mark of the compressed video recording 802.

Thus, referring again to FIG. 9, the content marking data 900 identifies, for each received content marking command, the event that the user attended, reference links to one or more video recordings of the event, and markers that signify the portions of the aforementioned video recordings that correspond to the moments that were marked by the user. For example, for the video recording "link-RScompressed" (corresponding to the compressed video recording 802 illustrated in FIG. 8), one marker indicates the 0:23:00 mark of the video recording (for the moment marked by content marking command 1) and another marker indicates the 0:49:00 mark of the video recording (for the moment marked by content marking command 2).

Similarly, according to another exemplary embodiment, the content marking module 206 may take into account the fact that the video recording of the event may start before the event actually begins (perhaps because the video recording includes pregame analysis before a game begins). Thus, the content marking module 206 may adjust the markers in the content marking data by accessing information indicating when in the video recording the event actually begins.

While the above examples refer to two video recordings of an event (i.e., a full video recording and a compressed video recording), it is apparent that there may be other examples of video recordings capturing the moment that is of interest to the user. As one example, if the marked moment that is of interest to the user is a memorable play in a sporting event, then this moment may be included in a highlight reel of various memorable sporting moments (collected from different sporting events throughout the day) in an episode of a sports news television program. If the content marking module 206 is able to access information indicating which segments of the video recording of the episode correspond to various portions of the event, then the content marking module 206 may generate content markers for the video recording of the episode, using the methods described above. For example, if the content marking module 206 accesses information indicating that 0:13:00-0:15:00 of the video recording of the episode corresponds to 8:37 pm-8.39 pm of the Red Sox vs. Yankees baseball game, then the content marking module 206 may generate a content marker indicating the 0:14:00 portion of the video recording of the episode corresponding to content marking command 1 received at 8.38 pm.

Figure 10:
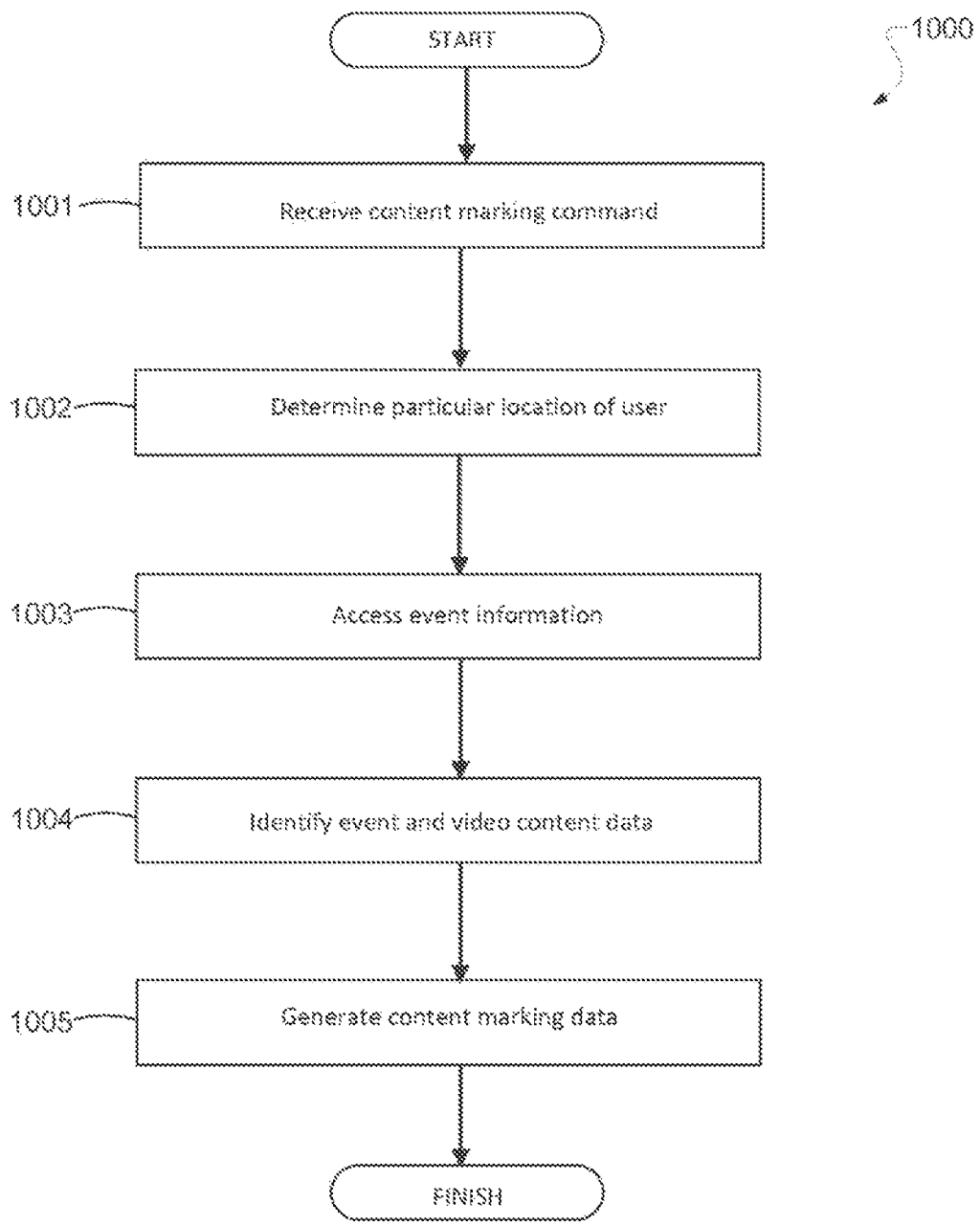
FIG. 10 is a flowchart illustrating an example method, according to various embodiments

FIG. 10 is a flowchart illustrating an example method 1000, according to various embodiments. The method 1000 may be performed at least in part by, for example, the content marking system 200 illustrated in FIG. 2 (or an apparatus having similar modules, such as client machines 110 and 112 or application server 112 illustrated in FIG. 1). In 1001, the interface module 202 receives, via a user interface displayed on mobile device (see FIG. 4a), a user selection of a content marking command at a particular time. The content marking command may indicate a user interest in a particular moment of an event viewed by a user. In 1002, the interface module 202 determines a particular location of the user, based on geo-location information received from the user's mobile device. In 1003, the identification module 204 accesses event information (e.g., see FIG. 6) identifying multiple events, and locations and start and end times associated with each of the events.

In 1004, the identification module 204 identifies the event viewed by the user when they submitted the content marking command in 1001. For example, the event information accessed in 1003 may indicate that a given event is associated with the particular location determined in 1002 and the particular time received in 1001, indicating that this given event is the event viewed by the user when they submitted the content marking command in 1001. Moreover, in 1004, the identification module 204 identifies video content data corresponding to the determined event. For example, the event information accessed in 1003 may further include a reference link to the video content data corresponding to the event (e.g., see FIG. 6). In 1005, the content marking module 206 generates content marking data indicating a particular portion of the video content data (identified in 1004) that corresponds to the particular moment of the event that was marked by the user in 1001. As one example, if the event information accessed in 1003 indicates a start time and an end time of the event, the content marking data is generated based on a difference between the particular time (received in 1001) and the start time of the event.

As described in various examples above, a moment of interest to a user (e.g., a memorable play in a sporting event being viewed by the user) may be marked by a single content marking command. However, it is possible that the underlying "moment" of interest to the user may last anywhere from a fraction of a second to several minutes, for example. If the underlying moment of interest to the user lasts for a second or a few seconds, then a single content marking command may be appropriate for signifying the moment of interest. However, according to another exemplary embodiment, a moment of interest may also be marked by more than one content marking command. For example, if the user submits two content marking commands within a certain time period of each other, then the interface module 202 may ask the user whether the first and second content marking commands define the beginning and ending, respectively, of a single moment of interest. For example, if the user submits a first content marking command (e.g., via the user interface 400 illustrated in FIG. 4a), and then submits a second content marking command (also via the user interface 400) within a certain time (e.g., 1 minute) after the first content marking command, then the interface module 202 may display the user interface 1100 illustrated in FIG. 11a, requesting the user to confirm whether the first and second content marking commands define the beginning and ending, respectively, of a single moment of interest. If so, then the content marking data generated by the content marking module 206 may indicate that the first and second content marking commands define the beginning and ending, respectively, of a single moment of interest. For example, FIG. 11b illustrates another version of content marking data 1110 generated by the content marking module 206 that indicates, for a given event, a video recording of the event, as well as a beginning content marker and an ending content marker that define a portion of the video recording that corresponds to a marked moment.

By accessing the content marking data illustrated in FIG. 9, a playback module 210 of the content marking system 200 illustrated in FIG. 2 (or a distinct playback module remote from the content marking system 200) may allow the user to easily navigate the video recording of an event, in order to find and view footage of the moments that were marked by the user. The aforementioned playback module or distinct playback module may correspond to a media player application program implemented on a media player device, such as a television set, cable set-top box, digital video recorded (DVR) player, personal computing device, smartphone, tablet computer, etc. According to various exemplary embodiments, when the playback module 210 receives a user command to play a specific video recording, the playback module 210 accesses the content marking data associated with that video recording, and displays a video playback user interface allowing the user to navigate to specific portions of that video recording specified by the associated content marking data.

For example, the playback module 210 may display the user interface 1200 illustrated in FIG. 12a, which is configured to receive a user command to play a video recording of a particular event, such as the "Red Sox vs. Yankees" baseball game. The event options listed in the user interface 1200 may include all events for which video recordings are available, or a subset of such events (e.g., only events for which content marking commands have been received). If multiple different video recordings of that event are available, the playback module 210 may ask the user select the one video recording that the user would like to view. For example, if the playback module 210 accesses the event information illustrated in FIG. 6 or the content marking data 900 illustrated in FIG. 9, the playback module 210 will determine that there is both a full video recording and a compressed video recording of the "Red Sox versus Yankees" baseball game, and may display the user interface 1210 illustrated in FIG. 12*b* in order to solicit a user selection of one of the video recordings. Thereafter, the playback module 210 accesses the content marking data 900 illustrated in FIG. 9 to retrieve, if available, any content markers associated with that video recording (e.g., content marker 0:38:00 and 1:19:00 associated with the full video recording of the "Red Sox vs. Yankees" baseball game).

Figure 13:
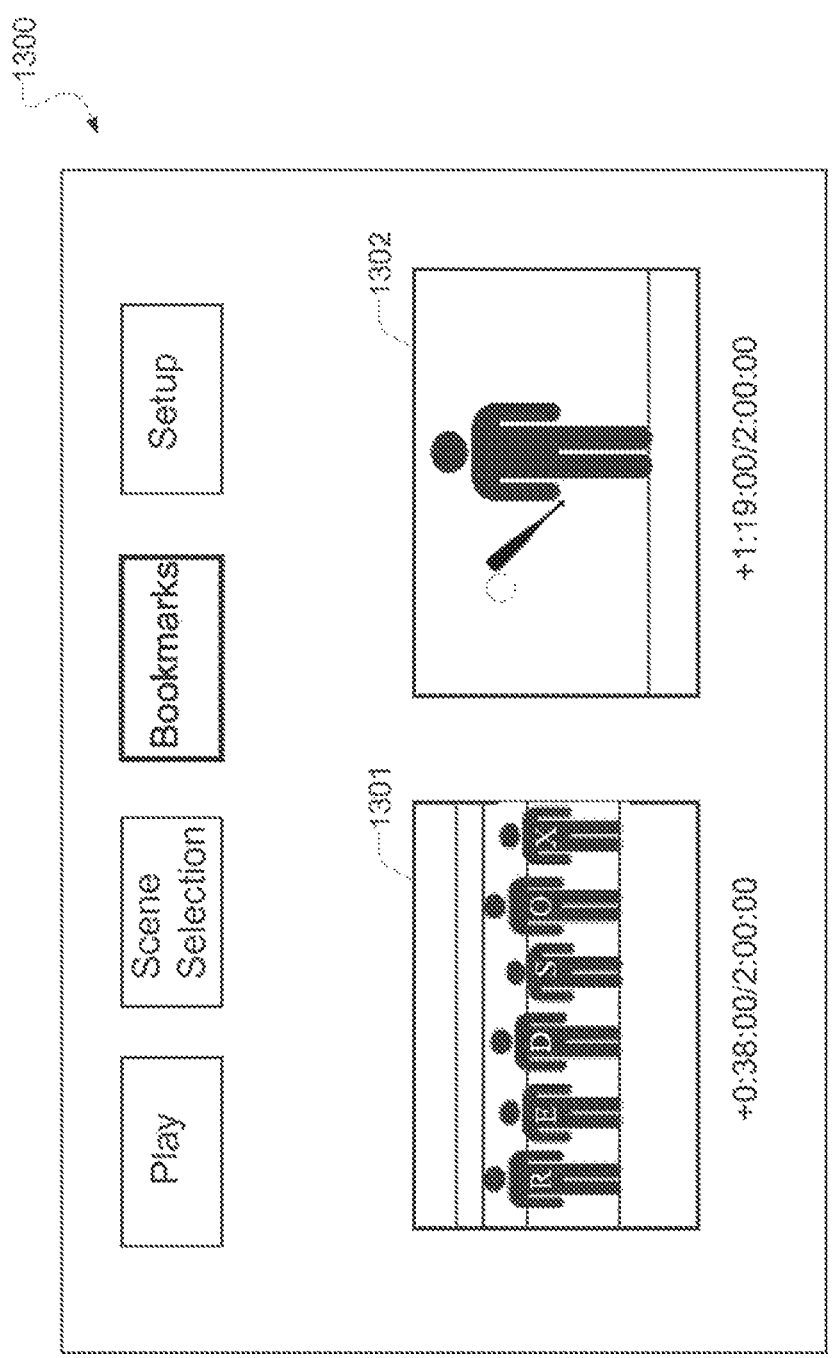
FIG. 13 illustrates an exemplary portion of a user interface, according to various embodiments.

FIG. 13 illustrates an exemplary portion 1300 of a video content playback user interface displayed by the playback module 210, after the user has indicated that they wish to view the full video recording of the "Red Sox" vs. Yankees" baseball game. When the user clicks the "Bookmarks" button in FIG. 13, the user is able to see to specific frame portions of the full video recording of the event corresponding to moments that were marked by the user. These frame portions are identified by the playback module 210, based on the markers included in the content marking data generated by the content marking module 206, as described above (see FIG. 9). Thus, the user can click on the frame portion 1301 in order to commence playback of the video recording of the game from the 0:38:00 mark of the full video recording. Similarly, the user can click on the frame portion 1302 in order to commence playback of the video recording of the game from the 1:19:00 mark of the full video recording.

Figure 14:
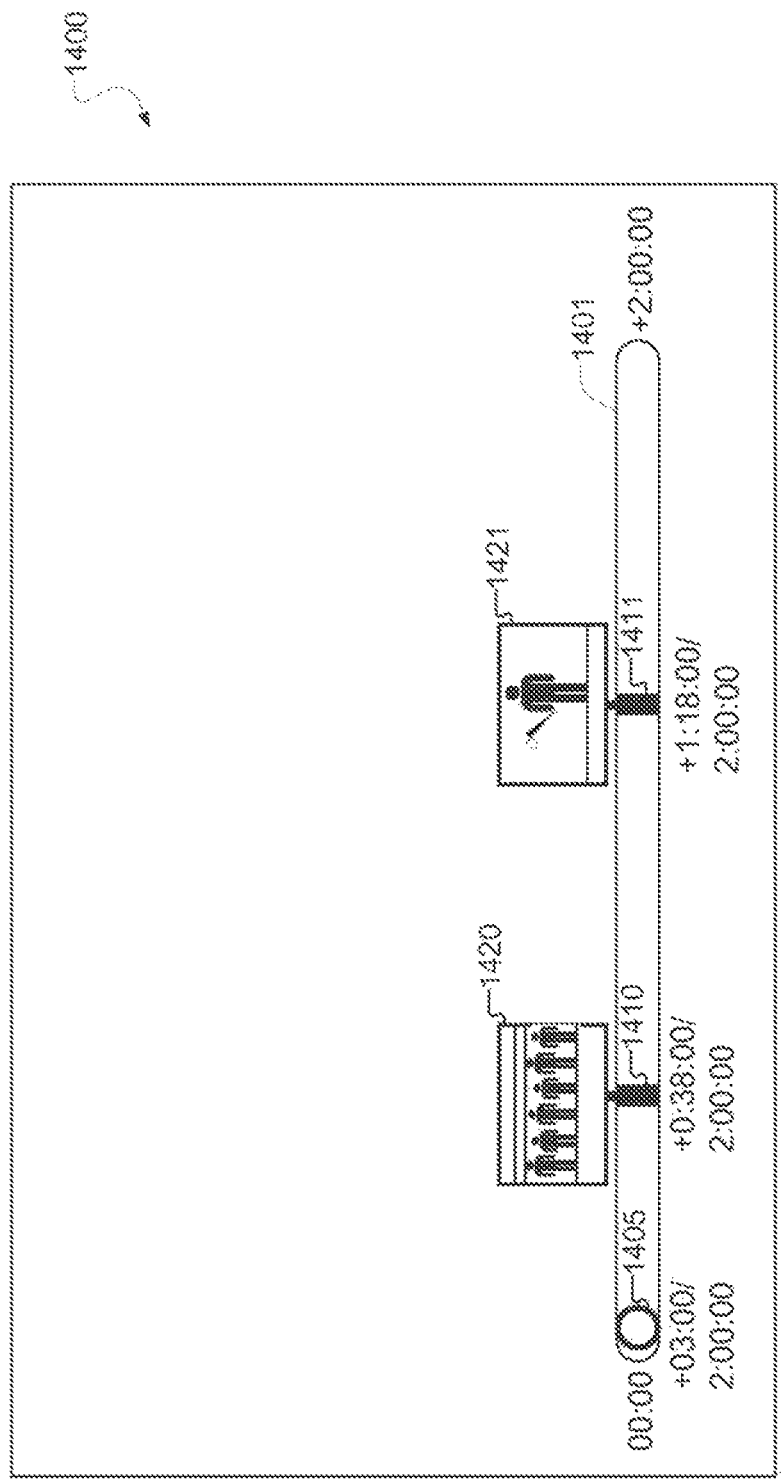
FIG. 14 illustrates an exemplary portion of a user interface, according to various embodiments.

As another example, FIG. 14 illustrates another exemplary portion 1400 of a video content playback user interface. In FIG. 14, the user interface includes a time ruler/bar 1401 for selecting different portions of the video recording (e.g., by detecting the user dragging and dropping the circular selector button 1405 in the time bar 1401). As seen in FIG. 14, certain portions 1410, 1411 of the time bar 1401 are highlighted, indicating portions of the full video recording of the game corresponding to the moments that were marked by the user. These portions are identified by the playback module 210 based on the markers included in the content marking data generated by the content marking system 200, as described above (see FIG. 9). The user may drag the circular selection button 1405 to the highlighted portions 1410, 1411 on the time bar 1401, or the user may simply click on the preview frames 1420, 1421 near the highlighted points 1410, 1411 on the time bar 1401. In this way, the user is able to directly and easily navigate to moments of interest in the full video recording. Similarly, such aspects may be applied to the compressed video recording described in various exemplary embodiments above.

According to an embodiment described above, if the content marking data indicates a beginning content marker and an ending content marker defining a portion of a video recording corresponding to a marked moment (e.g., see FIG. 11*b*), then when the user clicks on the frame portions (see 1301, 1302 in FIG. 13) or preview frames (see 1420, 1421 in FIG. 14), the playback module 210 will only play a specific portion of the video recording that starts at the beginning content marker and stops at the ending content marker.

According to various exemplary embodiments, the content marking module 206 may access a video recording of an event identified in the content marking data (see FIG. 9) and, based on the content markers in the content marking data, extract the portion of the video recording corresponding to the marked moment and save it as a "video clip" of the marked moment. For example, if a single content marker signifies the portion of the video recording corresponding to the marked moment, then the content marking module 206 may extract the portion of the video recording proximate to the content marker (e.g., 5 seconds prior to the content marker to 1 minute after the content marker) to generate the video clip. As another example, if a beginning content marker and an ending content marker indicate the portion of a video recording corresponding to the marked moment (e.g., see FIG. 11*b*), then the content marking module 206 may simply extract this portion of the video to generate the video clip. Although not illustrated in FIG. 9, a link to such video clips may be included in the content marking data 900. The playback module 210 may display user interfaces (e.g., see FIGS. 12*a* and 12*b*) allowing the user to request playback of such video clips, and the playback module 210 may access the link to the video clips in the content marking data 900 to commence playback. In this way, the user may watch an isolated marked moment repeatedly.

Figure 15:
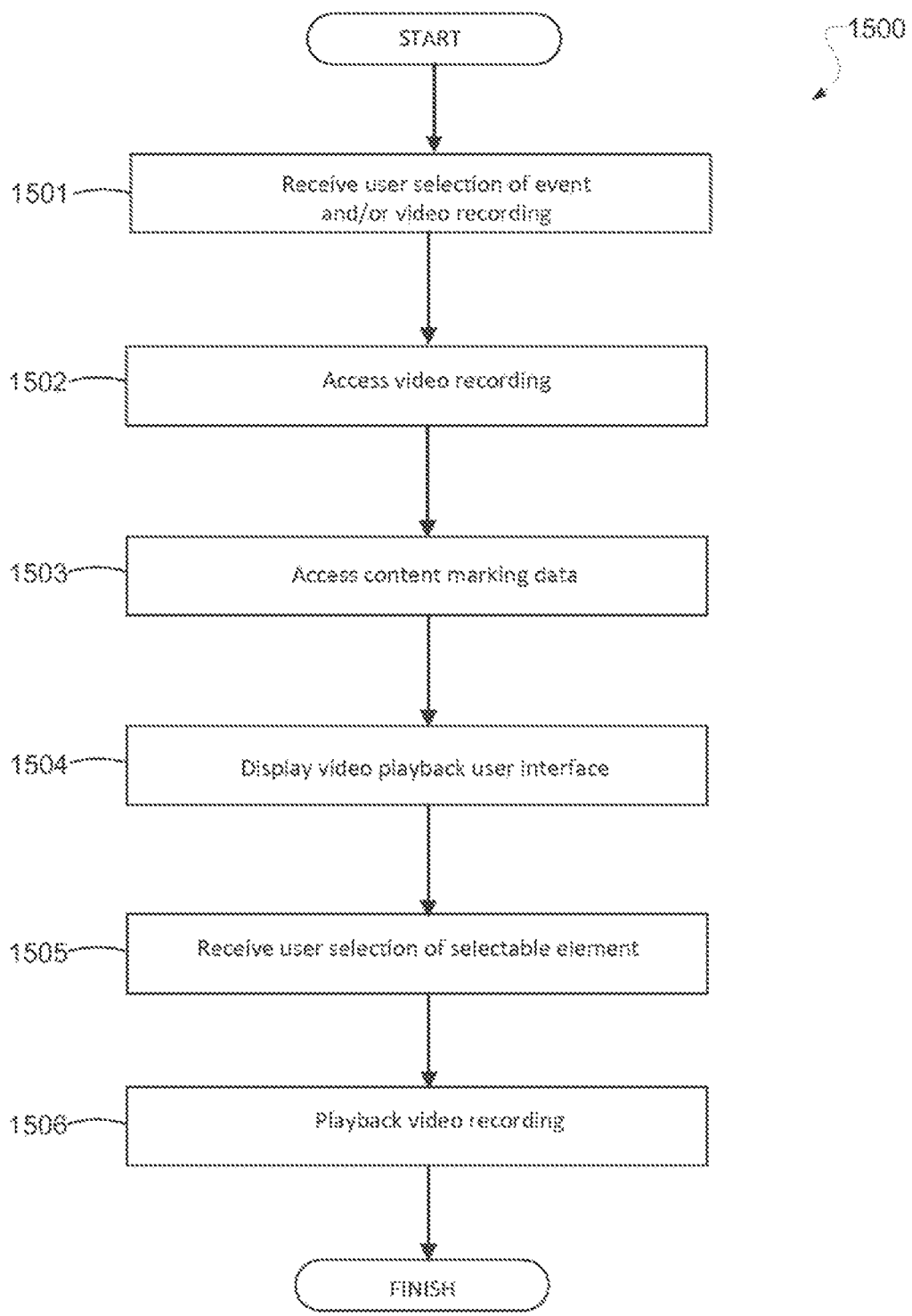
FIG. 15 is a flowchart illustrating an example method, according to various embodiments.

FIG. 15 is a flowchart illustrating an example method 1500, according to various embodiments. The method 1500 may be performed at least in part by, for example, the content marking system 200 illustrated in FIG. 2 (or an apparatus having similar modules, such as client machines 110 and 112 or application server 112 illustrated in FIG. 1). The example method 1500 may be performed after, for example, the example method 1000 illustrated in FIG. 10. In 1501, the playback module 210 receives a user selection of an event (e.g., see FIG. 12*a*) and/or a video recording of that event (e.g., see FIG. 12*b*). In 1502, the playback module 210 accesses a video recording of the event selected by the user in 1501. In 1503, the playback module 210 accesses content marking data (e.g., see FIG. 9) associated with the video recording of the event selected by the user in 1501. In 1504, the playback module 210 displays a video playback user interface to allow the user to view the video recording of the event selected by the user in 1501. FIGS. 13 and 14 illustrate exemplary video playback user interfaces, which include user selectable elements (e.g., see 1301, 1302 in FIGS. 13 and 1420 and 1421 in FIG. 14) that, when actuated, commence playback of particular portions of the video recording that are identified in the content marking data accessed in 1503. In 1505, the playback module 210 receives a user selection of one of the selectable elements in the video playback user interface displayed in 1504. In 1506, the playback module 210 commences playback of the video recording, based on the user selection received in 1505.

As described in various embodiments above, the content marking commands transmitted by the user may indicate the user's interests in a particular moment of an event, and that the user may wish to access a video recording of the marked moments of the event at a later time. According to another exemplary embodiment, the content marking commands may in fact indicate that the user has a dislike or aversion to the moments marked by the content marking commands. Such a content marking command indicates that, in fact, the user does not wish to view these moments of the event again. For example, if the user is viewing a sporting event, perhaps the user may mark a moment when the user's favourite player is injured, or when the user's favourite team commits a major mistake (fumble, missed game-winning shot, etc.), in order to indicate that the user does not wish to view these moments again (e.g., when the user is viewing a video recording of the event in the future).

For example, when the user submits the content marking command (e.g. by pressing the "mark this moment" button 401 in FIG. 4*a*), the interface module 202 may display the user interface 1600 illustrated in FIG. 16*a*, allowing the user to indicate whether they are marking this moment for future reference/viewing (e.g., because they like what they viewed) or whether they are marking this moment for "omission"

during playback of the video recording of the event (e.g., because they do not wish to view the moment again). If the user indicates the latter, the interface module 202 may display the user interface 1610 in FIG. 16*b*, allowing the user to request that a warning should be displayed before the marked moment of the event is displayed. Alternatively, the user interface 1610 allows the user to indicate that the marked moment can be replaced by alternate content, such a blank screen, an alternate channel specified by the user, a particular background picture specified by the user, another video recording (or specific portion thereof) specified by the user, and so on, as illustrated in FIG. 16*b*.

In this exemplary embodiment, the content markers generated by the content marking module 206 indicate moments in the event that the user does not wish to view. Thus, if the playback module 210 is instructed to playback the video recording of an event (e.g., see FIGS. 12*a* and 12*b*), then the playback module 210 plays the video recording of the event, but replaces the specific portions of the video recording identified by the content markers with the alternate content (specified by the user in FIG. 16*b*). This exemplary embodiment may be described with reference to the example method 1000 illustrated in FIG. 10 and an example method 1500 illustrated in FIG. 15. For example, in 1001, a content marking command is received, wherein the content marking command indicates a particular moment of an event that the user does not wish to view again. Thereafter, operation 1002-1006 and 1501-1503 are performed as described above. If the user requests playback of the video recording of the event in 1505, the playback module 210 commences playback of the video recording in 1506, wherein the playback module 210 replaces the specific portions of the video recording identified by the content markers (generated in 1005 and accessed in 1503) by alternate content specified by the user.

Although not illustrated in FIG. 16*b*, the user may also specify a duration for which the alternate content is to be displayed (e.g., for 3 seconds or 3 minutes after the content mark marker indicating the moment marked by the user). According to another embodiment, if the content marking data indicates a beginning content marker and an ending content marker defining a portion of a video recording corresponding to a marked moment (see FIG. 11*b*), then the playback module 210 simply displays the alternate content (specified by the user in FIG. 16*b*) in place of the portion of the video recording defined by the beginning content marker and ending content marker.

As described above, the identification module 204 may determine the event that the user is viewing by accessing event information (see FIG. 6) that lists multiple events, and times and locations associated with each of those events. This approach is particularly advantageous when the event being viewed by the user is a live event at which the user is physically present, since the location of the user's mobile device will correspond to the location of the event, which can be used by the content marking system 200 to identify the event.

According to another exemplary embodiment, the content marking system 200 permits the user to mark not only moments in a live event that the user is physically attending, but also any event that the user is viewing on a screen of a display device, such as a baseball game that the user is watching on a TV in a sports bar, a sporting highlight reel in an episode of a sports news program that the user is watching at home on their TV, a television show that a user is watching with friends on a friend's TV, a broadcast of a basketball game that the user is streaming onto their tablet computer or smart phone, a movie that the user is watching on a big screen in a movie theater, and so forth. Thus, the user may be watching an event on a display screen that may be located anywhere.

More specifically, the interface module 202 may utilize the location of the user's mobile device (from which the content marking command is received) to determine the particular display device located near the user (e.g., television set, screen in a movie theatre, screen of a tablet computing device, etc.) that the user is watching. The interface module 202 may then determine the event being viewed by the user, by accessing device history information of that display device.

For example, if the user location received together with the content marking command by the interface module 202 indicates a particular home address, the interface module 202 may access information indicating what display devices are located at this home address. For example, a cable television company may have information indicating whether a cable-connected television set is installed at that home address and, if so, device history information of the television set. It is apparent that instead of a home address, the user location may correspond to a business address, such as a sports bar, or any other location were a display device may be located. For example, the user location may even be determined to be a particular screening room in a movie theatre. This movie theater may maintain information regarding the different screens in each of the screening rooms of the movie theatre, and device history information for each of the screens. As another example, the user location may determined to be on a train, bus or plane where the user is actually viewing an event on their smart phone or tablet device. In such case, streaming history of the device may be utilized to determine the event being viewed by the user.

As described throughout this disclosure, "device history information" of a device indicates a history of what has been displayed by the device. For example, FIG. 17 illustrates exemplary device history information 1700 corresponding to a particular television set. The device history information 1700 indicates what broadcast event/program was displayed by the television set at a given time, as well as links to video recordings of each event. For example, it can be seen in FIG. 17 that the television set displayed Movie 1 on channel 67 from 3:55 pm to 4 pm, Movie 2 on channel 5 from 4 pm to 5 pm, and so on. The device history information illustrated in FIG. 17 is merely exemplary. For example, the device history information for a particular movie screen of a movie theater may indicate a history of movies being displayed on the movie screen, as described above.

Once the interface module 202 identifies the particular display device that the user is viewing at the time when the content marking command was submitted, the identification module 204 accesses the device history information of that device to determine the particular broadcast event/program that the user was viewing at that time when the content marking command was submitted. For example, suppose the event being viewed by the user is a memorable play in a highlight reel of various memorable sporting moments (collected from different sporting events throughout the day) in an episode of a sports news television program. If the interface module 202 receives a content marking command from the user at 7:05 pm on Jan. 2, 2012, and if the interface module 202 determines that the user is watching a device associated with the device history information of FIG. 17, then the identification module 204 may determine that the user was viewing the "Sports News TV Program". In this way, the identification module 204 determines the event being viewed by the user ("Sports News TV Program"), and also identifies video content data corresponding to the event (e.g., see the reference links to the video recordings in the device history information 1700, such as "link-Sports-News1-2-12"). Thereafter, the content marking module 206 may generate content marking data, using the methods described above in various exemplary embodiments. That is, if the episode of the Sports News TV Program runs from 7 pm to 8 pm, and if the content marking module 206 has access to the one-hour video recording of the episode (e.g., see "link-SportsNews1-2-12" in FIG. 17), then the content marking module 206 may generate content marking data 1800 illustrated in FIG. 18 that includes the content marker of "0:05:00" associated with the video recording "link-SportsNews1-2-12" of the Sports News TV Program.

The user can then view the portions of the video recording corresponding to the moment marked by the user, as described in various embodiments of this disclosure (e.g., see FIGS. 12-14). Following on from the previous example, the content marking module 206 may access the video recording "link-SportsNews1-2-12" of the Sports News TV Program identified in the content marking data. Based on the content marker 0:05:00 in the content marking data associated with this video recording (see FIG. 18), the content marking module 206 or the playback module 210 may extract a portion of the video recording corresponding to the moment marked by the user and save it as a "video clip" of the moment, as described in various exemplary embodiments above. This way, the user can watch an isolated marked moment repeatedly.

Figure 19:
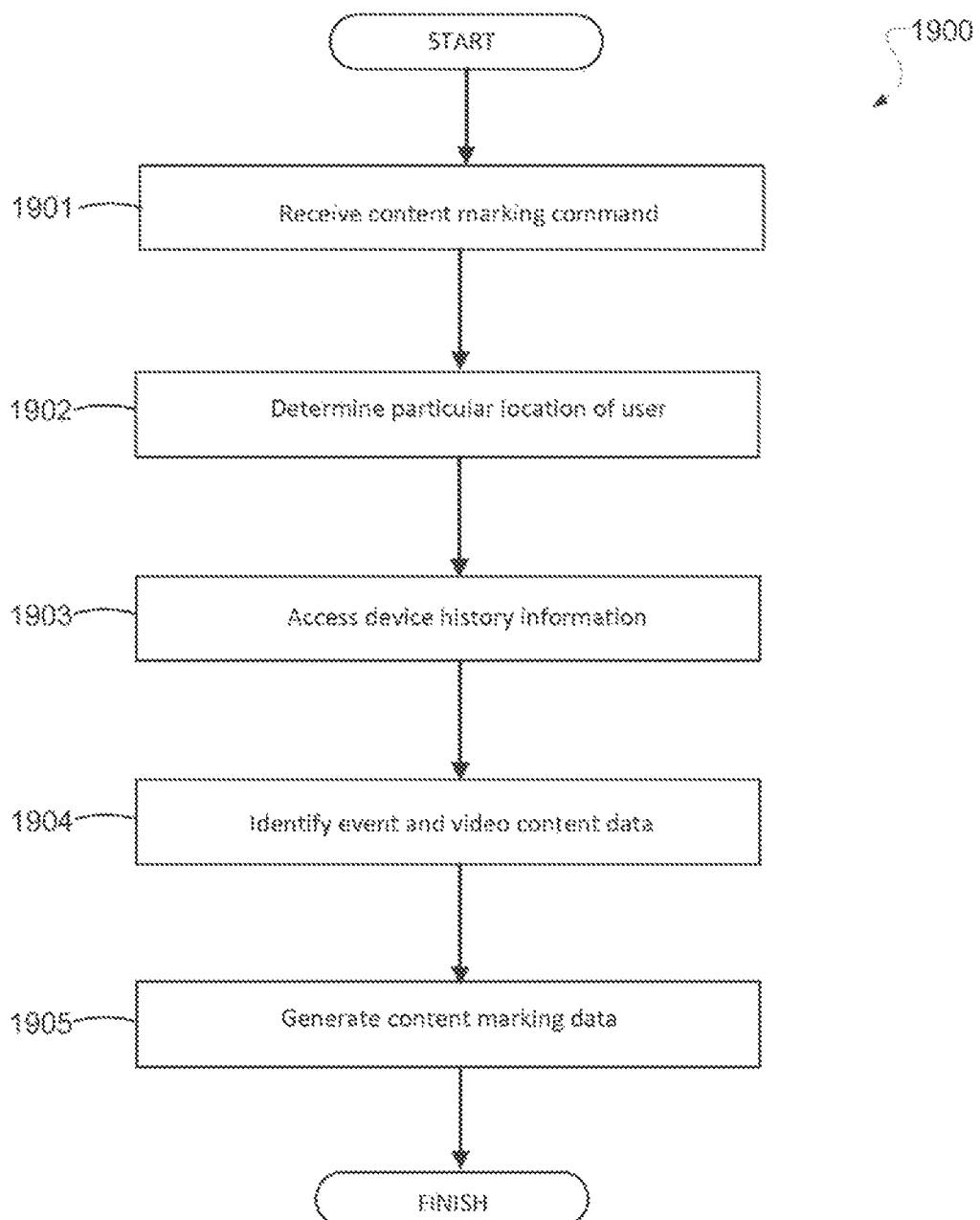
FIG. 19 is a flowchart illustrating an example method, according to various embodiments.

FIG. 19 is a flowchart illustrating an example method 1900, according to various embodiments. The method 1900 may be performed at least in part by, for example, the content marking system 200 illustrated in FIG. 2 (or an apparatus having similar modules, such as client machines 110 and 112 or application server 112 illustrated in FIG. 1). In 1901, the interface module 202 receives, via a user interface displayed on mobile device (e.g., see FIG. 4a), a user selection of a content marking command at a particular time. The content marking command may indicate a user interest in a particular moment of an event viewed by a user. In 1902, the interface module 202 determines a particular location of the user, based on geo-location information received from the user's mobile device. In 1903, the identification module 204 accesses device history information (e.g., see FIG. 17) of a display device located at the particular location determined in 1902. The device history information indicates a history of what has been displayed by the display device.

In 1904, the identification module 204 identifies the event viewed by the user when they submitted the content marking command in 1901. For example, the device history information accessed in 1903 may indicate that a given event was displayed by the display device at the particular time when the user submitted the content marking command in 1901. Moreover, in 1904, the identification module 204 identifies video content data corresponding to the determined event. For example, the device history information accessed in 1903 may further include a reference link to the video content data corresponding to the event. Alternatively, the identification module 204 may access a broadcast schedule that includes a reference link to the video content data corresponding to the event. In 1905, the content marking module 206 generates content marking data indicating a particular portion of the video content data (identified in 1904) that corresponds to the particular moment of the event that was marked by the user in 1901. For example, given the event viewed by the user (as determined in 1904), a broadcast schedule, programming schedule, TV guide, or the device history information may be accessed to determine the start and end times of the event, and the content marking data is generated based on a difference between the particular time (received in 1901) and the start time of the event. Thereafter, the content marking module 206 displays a video content playback user interface including a selection button that, when selected, is configured to play the particular portion of the video content data (e.g., see FIGS. 13 and 14), based on the content marking data generated in 1905.

As described in various embodiments, when the user desires to view an event or program, the user may select the event/program via a user interface (e.g., user interface 1200 illustrated in FIG. 12a). The playback module 210 then accesses a link to the video recording, such as a link included in the content marking data (see FIG. 9 or FIG. 18). If the link references a storage location of a hard drive connected to a DVR device of the user, then the playback module 210 may be able to immediately access the video recording from the hard drive. On the other hand, if the link references an official distributor of content, such as a sporting league or an official television broadcast network, then it is possible that attempting to access this link results in a response from the official distributor that the user must purchase the video recording from the official distributor. For example, after the user selects an event/program that the user desires to view via the user interface 1200 illustrated in FIG. 12a (where the list of potential events/programs may include all those identified in the content marking data), then the playback module 210 may display the user interface 2000 illustrated in FIG. 20a, informing the user that the video recording of the event/program selected by the user is available for purchase in one of various formats (e.g., DVD, Blu-ray, streaming download, etc.). If the user indicates via the user interface 2000 that they wish to purchase the video recording in a particular format, the playback module 210 may place an order for the video content with an official distributor, seller, or promoter of that video recording (e.g., a sporting league or television network broadcaster).

As another example, suppose the user is watching a new release at a movie theatre, and during the movie the user wishes to mark particular moments in the movie. It is possible that video content data of the movie is not yet available, because the movie has not yet been released for download or purchase. Thus, the links in the device history information for the movie theatre screen may include links to a production studio, distributor, vendor, etc. associated with the movie, and these links may be incorporated into the content marking data. If the user specifies that they desire to view the movie (e.g., via the user interface 1200 illustrated in FIG. 12a), the playback module 210 may display a user interface 2010 illustrated in FIG. 20b, informing the user that they may pre-order the movie or be notified when the movie is available for purchase. If the user selects the pre-order option, the playback module 210 may utilize the reference links in the content marking data for placing a pre-order for the movie. Alternatively, if the user selects the "Remind me after release" option, the content marking system 200 may track the release date for the movie, so that when the movie is released for purchase/download, the content marking system 200 automatically reminds the user and/or transmits a request to the official distributor to purchase the movie.

After the purchased video recording is obtained, such as by download in the case of a digital copy, or by mail in the case of the DVD or Blu-ray copy, the user may attempt to access the video recording (such as by selecting the digital copy in a user interface or by inserting the DVD or Blu-ray into a player device connected to the content marking system 200). After the playback module 210 detects this activity, the playback module 210 identifies the exact video recording being viewed (based on identification data included in the downloaded copy, streaming copy, DVD, Blu-ray etc.), and determines whether this particular video recording is described in the content marking data 900 (i.e., whether there are any content markers for this video recording). If so, then the playback module 210 may display the video playback user interfaces described in conjunction with FIGS. 13 and 14, allowing the user to navigate to specific portions of that video recording that are specified by the associated content markers.

The content marking system 200 may perform the aforementioned process any time a user attempts to playback a video recording. For example, any time the user inserts a DVD or Blu-ray disc of the video recording into a player device or begins to play a streaming or downloaded copy of a video recording, the playback module 210 may determine whether content marking data for this video recording exists. If so, the playback module 210 may display the video playback user interfaces described in conjunction with FIGS. 13 and 14, allowing the user to navigate to specific portions of that video recording that are specified by the associated content markers.

Figure 21:
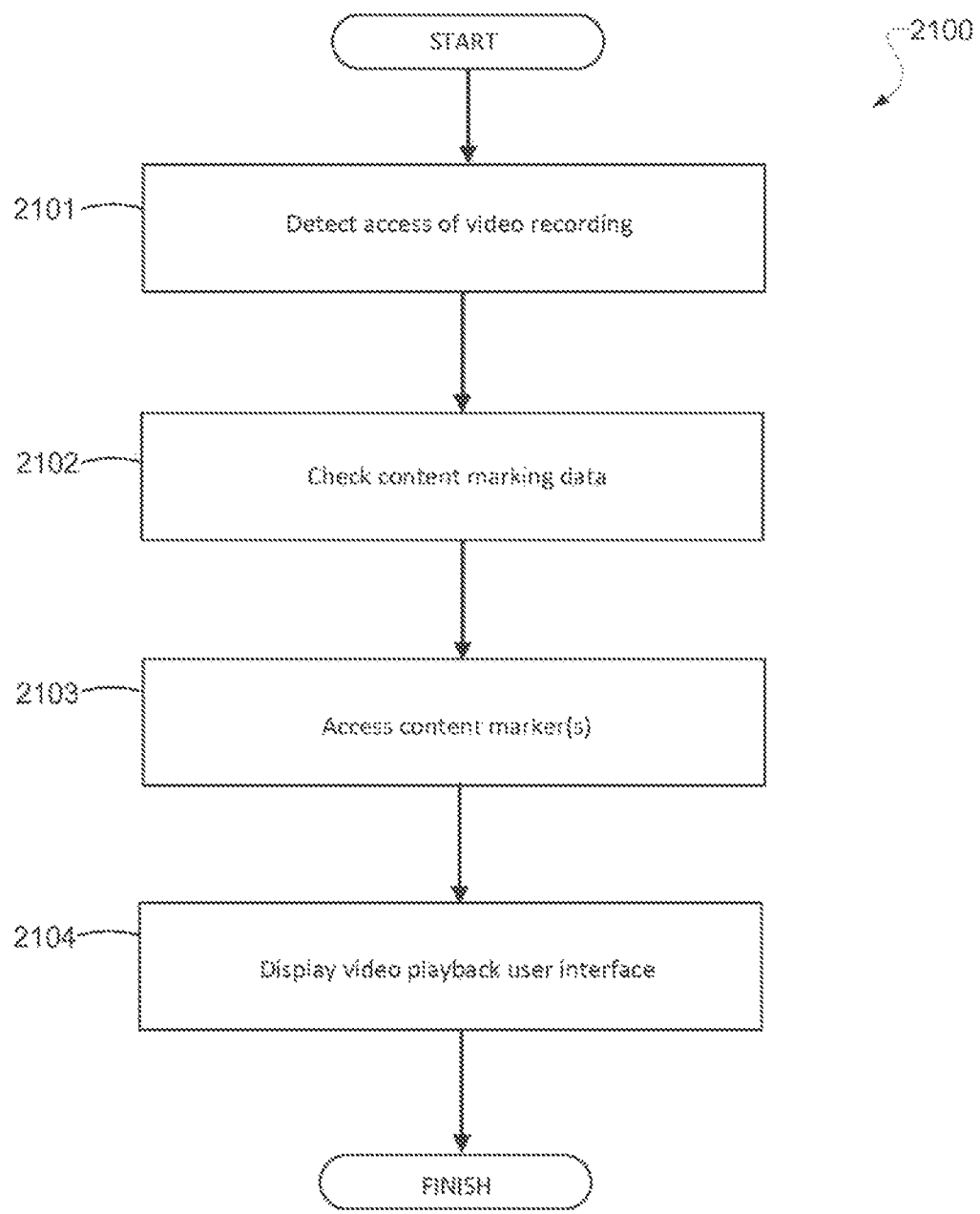
FIG. 21 is a flowchart illustrating an example method, according to various embodiments.

FIG. 21 is a flowchart illustrating an example method 2100, according to various embodiments. The method 2100 may be performed at least in part by, for example, the content marking system 200 illustrated in FIG. 2 (or an apparatus having similar modules, such as client machines 110 and 112 or application server 112 illustrated in FIG. 1). In 2101, the playback module 210 detects access of a video recording. For example, may detect a user selection of a downloaded or streaming copy of the video recording, or detect a user inserting a DVD or Blu-ray of the video recording into a player device connected to the content marking system 200. In 2102, the playback module 210 identifies the exact video recording being viewed (based on identification data included in the downloaded copy, streaming copy, DVD, Blu-ray disc, etc.), and checks the content marking data to determine whether this particular video recording is described in the content marking data (i.e., whether there are any content markers for this video recording). In 2103, the playback module 210 accesses the content markers in the content marking data associated with the video recording. In 2104, the playback module 210 displays a video playback user interface described in conjunction with FIGS. 12 and 13, allowing the user to navigate to specific portions of that video recording that are specified by the associated content markers.

According to another exemplary embodiment, the content marking system 200 may analyze the portion of a video recording corresponding to a marked moment, and determine whether any products or items may be identified in that portion of the video recording. For example, the playback module 210 may utilize any of a number of known image recognition techniques to analyze the video content data (e.g, pixels) of the video recording, in order to identify any products, product brands, product logos, etc., in the video recording. As one example, if the marked portion includes a memorable play by an athlete on a sporting team, the playback module 210 may perform an image recognition analysis of the video frames of the marked portion in order to detect a uniform being worn by the athlete. Other examples include recognizing a particular vehicle, piece of furniture, piece of clothing, electronic device, beverage, food container, etc. If the playback module 210 detects such items in the marked portion of the video recording, the playback module 210 may present advertisements or coupons related to these products to the user. Moreover, the playback module 210 may access websites of sellers selling these products to allow the user to purchase such products. Further, the playback module 210 may insert these products into a watch list, favourites list, bookmarks list, etc., associated with the user (or associated with a user account of the user, such as a user account on a marketplace website).

Figure 22:
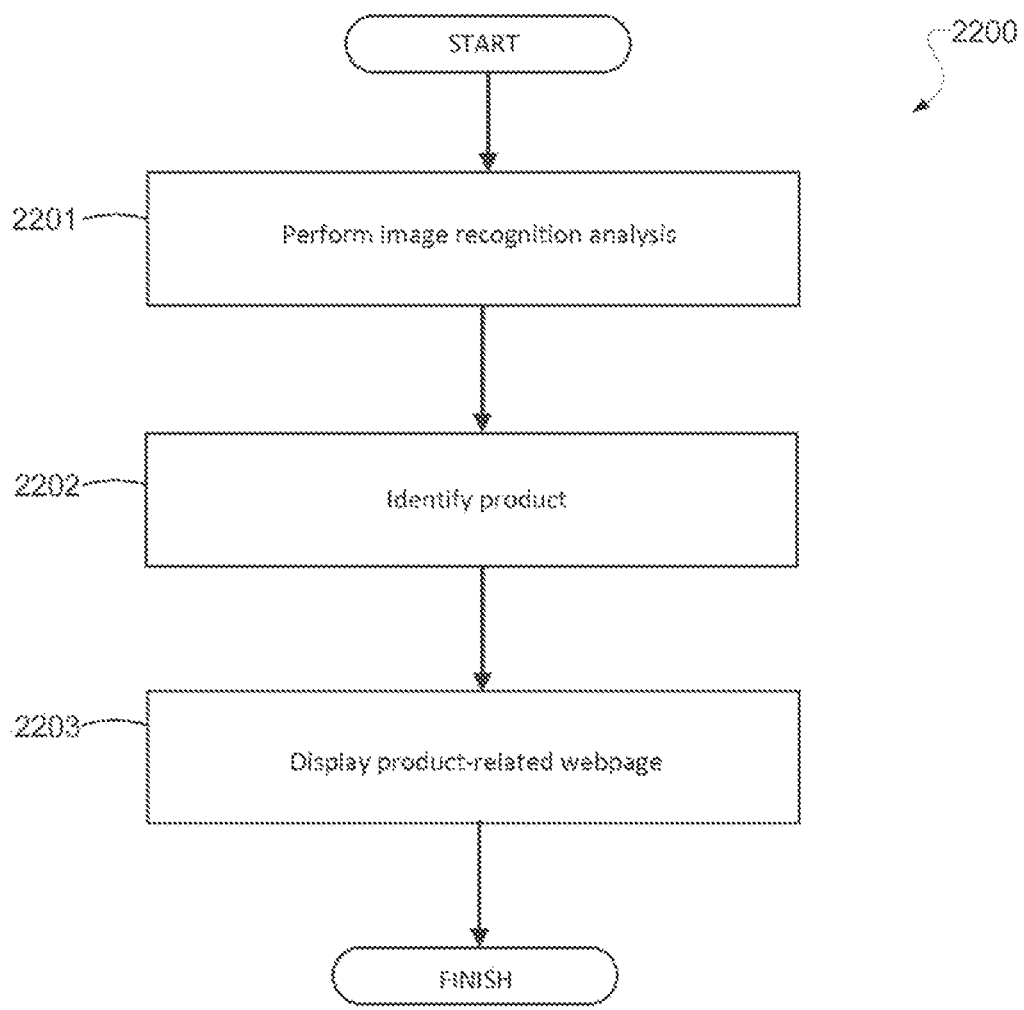
FIG. 22 is a flowchart illustrating an example method, according to various embodiments.

FIG. 22 is a flowchart illustrating an example method 2200, according to various embodiments. The method 2200 may be performed at least in part by, for example, the 200 illustrated in FIG. 2 (or an apparatus having similar modules, such as client machines 110 and 112 or application server 112 illustrated in FIG. 1). In 2201, the playback module 210 performs an image recognition analysis of a portion of a video recording corresponding to a marked moment. In 2202, the playback module 210 identifies a product in the portion of the video recording analyzed in 2201. In 2203, the playback module 210 displays a product related webpage that is in some way related to the product identified in 2202. For example, the product related webpage may include advertisements or coupons related to identified product, or may be a webpage of a seller selling the identified product, or webpage displaying a watch list, favourites list, bookmarks list, etc., including the identified product.

As described above, the identification module 204 is configured to identify the event that the user is viewing based on, for example, event information (see FIG. 6) and or device history information (see FIG. 17). However, it is possible that such approach may result in the identification module 204 determining that there are multiple possible events that the user may have been viewing (also referred to as candidate events), without being able to narrow down the possibilities further. For example, if the user location of the user submitting the content marking command corresponds to a sports bar, the identification module 204 may determine that multiple display devices (e.g., TV screens) are actually located near the user at the particular time when the content marking command is received. As another example, perhaps the user location information cannot be obtained due to some error; thus, with only the particular time associated with the content marking command, it may be difficult to determine which event the user is viewing. Thus, according to various exemplary embodiments, the identification module 204 is able to identify the event that the user is viewing from among multiple candidate events, based on user preference information indicating user preferences of the user.

As described herein, user preferences refer to any interests, preferences, likes, affinities, etc., that the user may have (e.g., for one or more items, fields, activities, the objects, etc). The preferences of the user may be determined in multiple ways. For example, the content marking system 200 may display a user interface to the user, allowing the user to specify some of their preferences directly. As another example, the content marking system 200 may perform a network search of websites and webpages describing the user and their preferences (e.g., a profile page of the user, a homepage of the user, articles written by the user, a resume of the user, etc.). As another example, the content marking system 200 may access a social or professional networking website to access information regarding the user and their preferences (e.g., by analyzing pages or profiles liked or shared by the user, by analyzing status updates, comments, or posts of the user, and the like). As another example, the content marking system 200 may access purchase history information of the user in order to determine items or services that the user has previously purchased. Each of the aforementioned sources of information may provide insights into the preferences of the user, such as whether the user has a demonstrated interest in a particular sporting team, TV show, movie, and so on.

Thus, if the identification module 204 has multiple candidate events that the user may have viewed, the identification module 204 may filter these events using the user preference information, to determine the particular event that the user was viewing. For example, if the event information (see, e.g., FIG. 6) for a particular time indicates that both a baseball game and a boat show was taking place, and if the preference information for the user indicates a demonstrated interest in baseball (but not boats), then the identification module 204 may determine that the baseball game is, in fact, the event that the user was viewing.

According to another exemplary embodiment, the identification module 204 may filter the list of candidates events based on user viewing history information indicating previous events viewed by the user. For example, the aforementioned "user viewing history information" may correspond to the device history information (see, e.g., FIG. 17) for a television set of the user, which indicates what programs the user has viewed and when. Moreover, the aforementioned "user viewing history information" may correspond to the content marking data (see, e.g., FIG. 9) that identifies events that were previously viewed by the user when content marking commands were submitted. The identification module 204 may perform data analysis on this information to determine what programs/events the user tends to view under various conditions.

For example, the identification module 204 may determine that on weekday afternoons the user tends to watch a particular daytime soap opera TV show, whereas on Sunday afternoons the user tends to watch baseball games including the Red Sox baseball team. Using this information, the identification module 204 may determine that if the user is viewing an event on a Sunday afternoon and there are multiple candidate events at this time (including one or more baseball games), then the identification module 204 may assume that the user is watching the baseball game including the Red Sox baseball team. As another example, the identification module 204 may determine that whenever the user is at a particular location (e.g., a particular sports bar), the user tends to watch baseball games including the Red Sox baseball team. Using this information, the identification module 204 may determine that if the user is viewing an event at the sports bar, and there are multiple candidate events at this time/location (including one or more baseball games), then the identification module 204 may assume that the user is watching the baseball club game including the Red Sox baseball team. As another example, the identification module 204 may determine that the user has watched every baseball game this season that includes the Red Sox baseball team, regardless of when these games occur. Using this information, the identification module 204 may determine that if the user is viewing an event and there are multiple candidate events at this time/location, one of which is a baseball game including the Red Sox baseball team, then the identification module 204 may assume that the user is watching the baseball game including the Red Sox baseball team.

Figure 23:
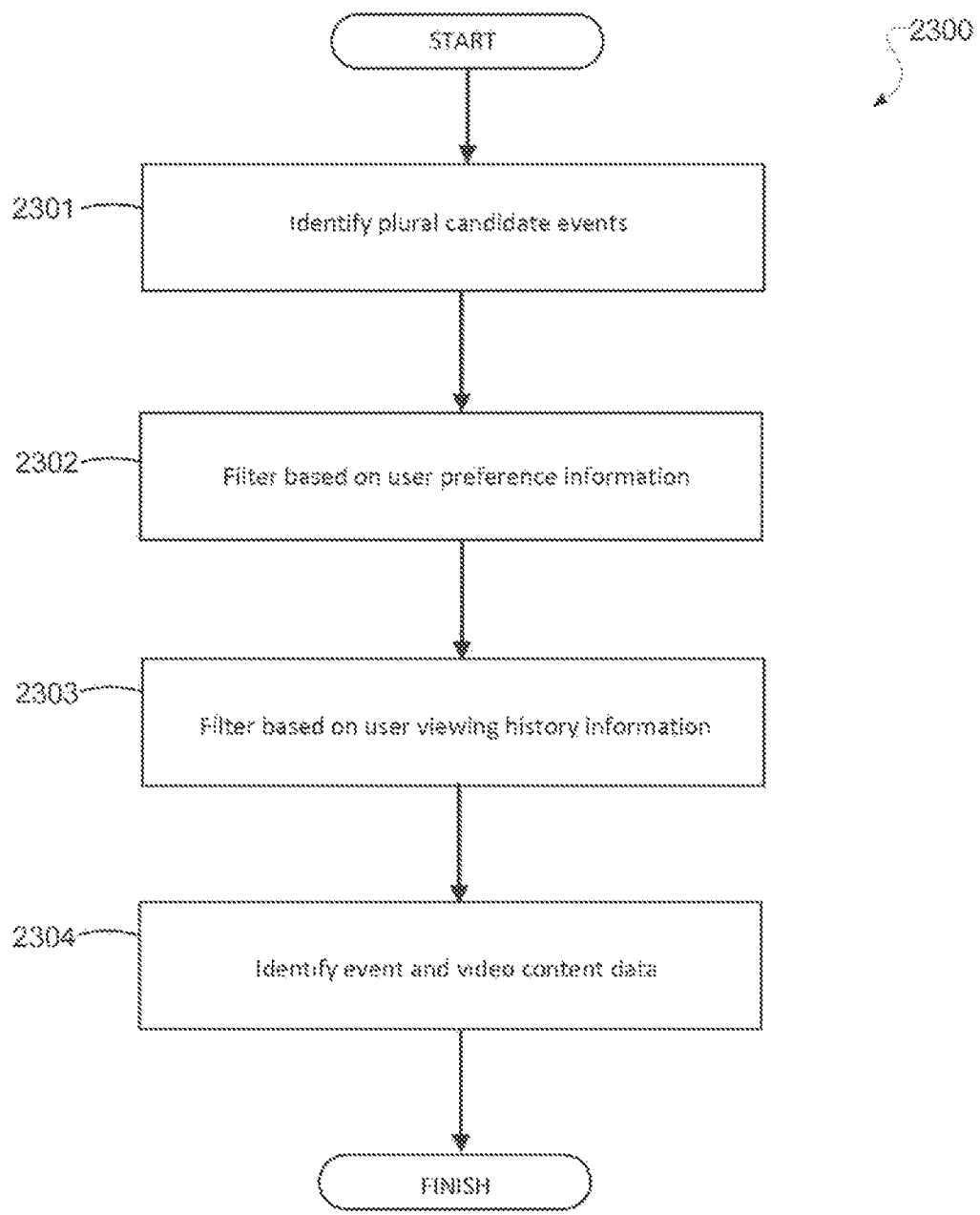
FIG. 23 is a flowchart illustrating an example method, according to various embodiments.

FIG. 23 is a flowchart illustrating an example method 2300, according to various embodiments. The method 2300 may be performed at least in part by, for example, the content marking system 200 illustrated in FIG. 2 (or an apparatus having similar modules, such as client machines 110 and 112 or application server 112 illustrated in FIG. 1). The method 2300 may replace, for example, operation 302 in FIG. 3, operation 1004 in FIG. 10, or operation 1904 in FIG. 19. In 2301, the identification module 204 identifies a list of candidate events, one of which corresponds to an event being viewed by user when the content marking command was submitted. In 2302, the identification module 204 filters the list of candidate events, based on user preference information indicating user preferences of the user. In 2303, the identification module 204 filters the list of candidate events, based on the user viewing history information indicating previous events viewed by the user. In 2304, the identification module 204 identifies the event that the user was viewing, after the list of candidate events is filtered in 2302 and/or 2303. The identification module 204 may optionally display a user interface screen asking the user to confirm the determined event (see, e.g., FIG. 7). In 2304, the identification module 204 may also identify video content data corresponding to the determined event.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 24:
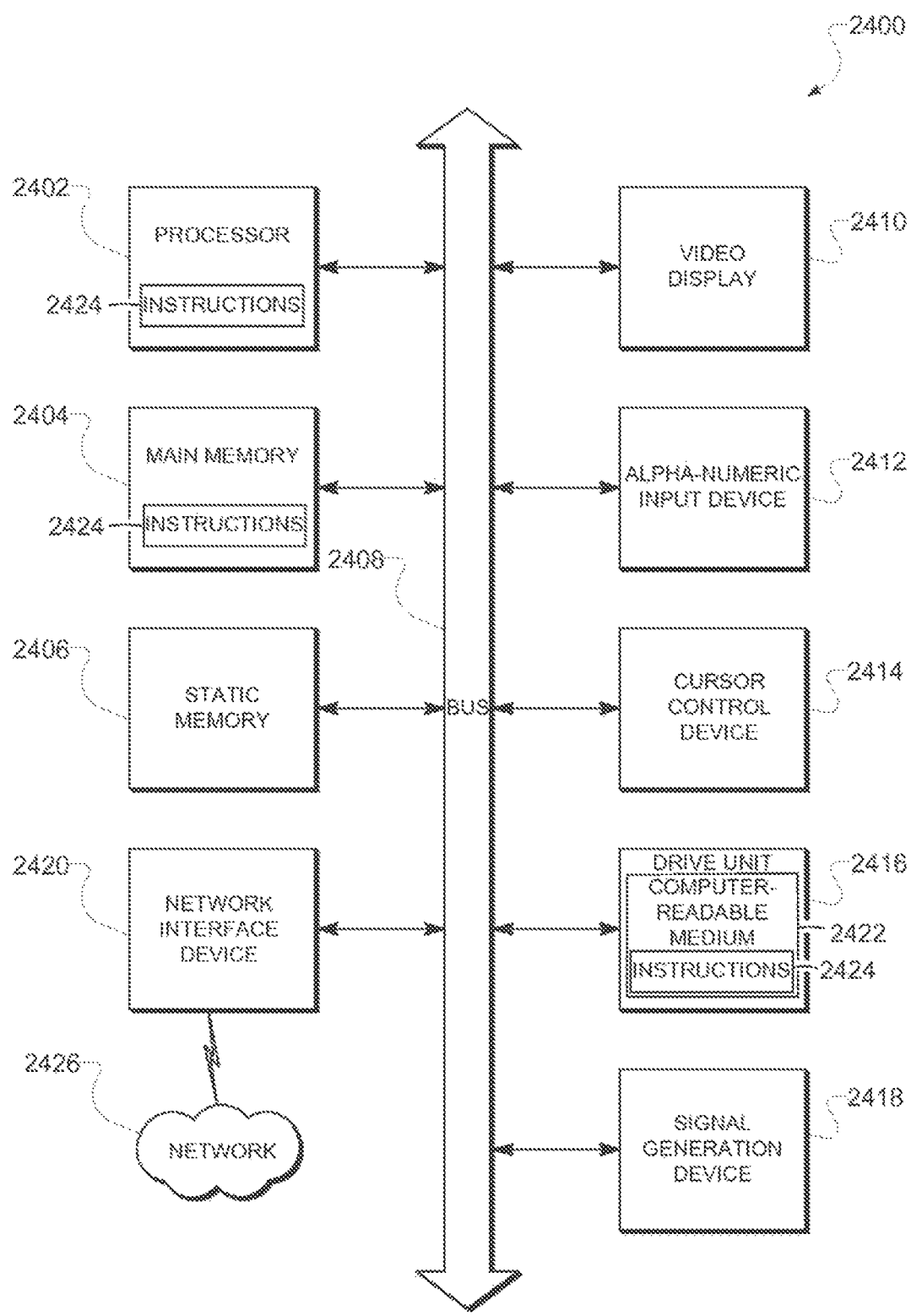
FIG. 24 is a diagrammatic representation of a machine in the example form of a computer system within which a set of instructions, for causing the machine to perform any one or more of the methodologies discussed herein, may be executed.

FIG. 24 is a block diagram of machine in the example form of a computer system 2400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a central processing unit (CPU), a graphics processing unit (GPU) or both), a main memory 2404 and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2412 (e.g., a keyboard or a touch-sensitive display screen), a user interface (UI) navigation device 2414 (e.g., a mouse), a disk drive unit 2416, a signal generation device 2418 (e.g., a speaker) and a network interface device 2420.

Machine-Readable Medium

The disk drive unit 2416 includes a machine-readable medium 2422 on which is stored one or more sets of instructions and data structures (e.g., software) 2424 embodying or utilized by any one or more of the methodologies or functions described herein. The instructions 2424 may also reside, completely or at least partially, within the main memory 2404 and/or within the processor 2402 during execution thereof by the computer system 2400, the main memory 2404 and the processor 2402 also constituting machine-readable media.

While the machine-readable medium 2422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2424 may further be transmitted or received over a communications network 2426 using a transmission medium. The instructions 2424 may be transmitted using the network interface device 2420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a non-transitory memory; and
   one or more hardware processors coupled to the non-transitory memory and configured to read instructions from the non-transitory memory to cause the system to perform operations comprising:
   receiving, from a mobile device, a content marking command selected by a user of the mobile device at a same time at which content is being displayed on a particular device of a plurality of devices, the content marking command indicating a user interest in a particular moment of an event in the displayed content viewed by the user on the particular device, wherein the displayed content is not associated with an account of the user;
   identifying, using location data from the mobile device, the particular device, different from the mobile device, wherein the particular device is unidentified to the system prior to receiving the content marking command;
   determining the event being displayed to the particular device by accessing device history information of the particular device;
   determining event information corresponding to the displayed content at a time at which the content marking command was received;
   identifying, based on the event information, one or more additional recordings of the event; and
   providing a reference link to ones of the one or more additional recordings of the event.

2. The system of claim 1, wherein identifying the particular device includes identifying a particular business using the location data.

3. The system of claim 2, wherein accessing the device history information of the particular device includes accessing a web site associated with the particular business.

4. The system of claim 1, wherein the event information indicates a start time and an end time of the event, and wherein the operations further comprise generating content marking data related to the event based on a difference between the time the content marking command was selected and the start time of the event.

5. The system of claim 1, wherein each of the additional recordings of the event is from a different source.

6. The system of claim 1, wherein the operations further comprise displaying the reference links to each of the one or more additional recordings of the event that, when selected, is configured cause a particular one of the one or more additional recordings of the event to be played.

7. The system of claim 1, wherein at least one of the one or more additional recordings of the event includes a compressed version of the event that includes only highlights of the event.

8. A method comprising:
    receiving, from a mobile device, a content marking command selected by a user of the mobile device at a same time at which content is being displayed on a particular device of a plurality of devices, the content marking command indicating a user interest in a particular moment of an event in the displayed content viewed by the user on the particular device, wherein the displayed content is not associated with an account of the user;
    identifying, using location data from the mobile device, the particular device, different from the mobile device, wherein the particular device is unknown prior to receiving the content marking command;
    determining the event being displayed to the particular device by accessing device history information of that particular device;
    determining event information corresponding to the displayed content at an elapsed time at which the content marking command was received;
    identifying, based on the event information, one or more additional recordings of the event; and
    providing a reference link to ones of the one or more additional recordings of the event.

9. The method of claim 8, wherein the event information includes at least one of a time or a location of the event captured in the displayed content.

10. The method of claim 8, wherein the event information indicates a start time and an end time of the event, and wherein the content marking module generates the content marking data based on a difference between the time the content marking command was selected and the start time of the event.

11. The method of claim 8, wherein identifying the particular device includes identifying, using the location data, a particular business.

12. The method of claim 11, wherein accessing the device history information of the particular device includes accessing a web site associated with the particular business.

13. The method of claim 8, wherein each of the additional recordings of the event is from a different source.

14. The method of claim 8, further comprising displaying the reference links to each of the one or more additional recordings of the event that, when selected, is configured cause a particular one of the one or more additional recordings of the event to be played.

15. A non-transitory machine-readable storage medium having embodied thereon instructions executable by one or more machines to perform operations comprising:
    receiving, from a mobile device, a content marking command selected by a user of the mobile device at a same time at which content is being displayed on a particular device of a plurality of devices, the content marking command indicating a user interest in a particular moment of an event in the displayed content viewed by the user on the particular device, wherein the displayed content is not associated with an account of the user;
    identifying, using location data from the mobile device, the particular device, different from the mobile device, wherein the one or more machines do not know the identity of the particular device prior to receiving the content marking command;
    determining the event being displayed to the particular device by accessing device history information of that particular device;
    determining event information corresponding to the displayed content at an elapsed time at which the content marking command was received;
    identifying, based on the event information, one or more additional recordings of the event; and
    providing a reference link to ones of the one or more additional recordings of the event.

16. The non-transitory machine-readable storage medium of claim 15, wherein the event information includes at least one of a time or a location of the event captured in the displayed content.

17. The non-transitory machine-readable storage medium of claim 15, wherein the event information indicates a start time and an end time of the event, and wherein the operations further comprise generating content marking data related to the event based on a difference between the time the content marking command was selected and the start time of the event.

18. The non-transitory machine-readable storage medium of claim 15, wherein identifying the particular device includes identifying, using the location data, a particular business.

19. The non-transitory machine-readable storage medium of claim 18, wherein accessing the device history information of the particular device includes accessing a web site associated with the particular business.

20. The non-transitory machine-readable storage medium of claim 15, wherein each of the additional recordings of the event is from a different source.

* * * * *